US011190573B2

(12) United States Patent
Hu et al.

(10) Patent No.: US 11,190,573 B2
(45) Date of Patent: Nov. 30, 2021

(54) TECHNIQUES FOR IMPROVING IMPLEMENTATION OF A REMOTE BROWSER WITHIN A LOCAL BROWSER

(71) Applicant: VMware, Inc., Palo Alto, CA (US)

(72) Inventors: Jinxing Hu, Beijing (CN); Wenshuo Chen, Beijing (CN); Ruby Xing, Palo Alto, CA (US); Wang Baochen, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 55 days.

(21) Appl. No.: 16/045,604

(22) Filed: Jul. 25, 2018

(65) Prior Publication Data
US 2020/0036770 A1 Jan. 30, 2020

(51) Int. Cl.
H04L 29/08 (2006.01)
(52) U.S. Cl.
CPC ................ H04L 67/025 (2013.01)
(58) Field of Classification Search
CPC ................................ H04L 67/025
See application file for complete search history.

(56) References Cited

U.S. PATENT DOCUMENTS

| 8,650,494 B1* | 2/2014 | Sampath | G06F 3/01 715/740 |
|---|---|---|---|
| 9,201,850 B1* | 12/2015 | Buddhiraja | G06F 40/10 |
| 9,535,567 B1* | 1/2017 | Bagrinovskiy | G06F 3/033 |
| 10,320,809 B1* | 6/2019 | Alexander | H04L 67/02 |
| 10,567,541 B2* | 2/2020 | Vignali | H04L 67/42 |
| 10,853,218 B1* | 12/2020 | Beaman | G06F 11/3419 |
| 2001/0054020 A1* | 12/2001 | Barth | G06Q 10/02 705/37 |
| 2002/0087479 A1* | 7/2002 | Malcolm | G06Q 10/06 705/64 |
| 2009/0070404 A1* | 3/2009 | Mazzaferri | G06F 9/542 709/202 |
| 2009/0183110 A1* | 7/2009 | Murtagh | G06F 9/451 715/803 |
| 2009/0303187 A1* | 12/2009 | Pallakoff | G06F 3/04886 345/169 |
| 2010/0269039 A1* | 10/2010 | Pahlavan | G06F 9/452 715/702 |
| 2012/0151372 A1* | 6/2012 | Kominac | G06F 9/452 715/740 |

(Continued)

Primary Examiner — Blake J Rubin
(74) Attorney, Agent, or Firm — Fish & Richardson P.C.

(57) ABSTRACT

The present disclosure relates to techniques for causing functions provided by a remote browser to be executed when functions provided by a local browser are requested. For example, a local BHO can intercept a request for the local browser to perform a navigation function. When the navigation function is designated to be provided by the remote browser, the local BHO can (1) prevent the local browser from performing the navigation function and (2) send a communication to a remote BHO to cause the remote browser to perform the navigation function. The remote BHO can cause representations of webpages to be sent to the local browser without visual representations of functions provided by the remote browser. By not having such visual representations, the local BHO can use visual representations from the local browser as visual representations of functions provided by the remote browser.

21 Claims, 18 Drawing Sheets

(56) References Cited

U.S. PATENT DOCUMENTS

| | | | |
|---|---|---|---|
| 2012/0185874 A1* | 7/2012 | Cookson | H04L 67/10 |
| | | | 719/313 |
| 2012/0284632 A1* | 11/2012 | Baird | G06F 9/452 |
| | | | 715/749 |
| 2012/0317295 A1* | 12/2012 | Baird | H04L 67/02 |
| | | | 709/228 |
| 2012/0324365 A1* | 12/2012 | Momchilov | G06F 3/14 |
| | | | 715/738 |
| 2013/0046869 A1* | 2/2013 | Jenkins | G06F 3/04842 |
| | | | 709/223 |
| 2014/0129920 A1* | 5/2014 | Sheretov | H04L 63/0281 |
| | | | 715/234 |
| 2014/0308645 A1* | 10/2014 | Chaniotakis | H04W 4/80 |
| | | | 434/350 |
| 2014/0310344 A1* | 10/2014 | Venkatesh | H04L 67/42 |
| | | | 709/203 |
| 2015/0089512 A1* | 3/2015 | Li | G06F 21/53 |
| | | | 719/313 |
| 2017/0339250 A1* | 11/2017 | Momchilov | H04L 12/4641 |
| 2018/0338166 A1* | 11/2018 | Amiga | H04L 65/605 |
| 2018/0343179 A1* | 11/2018 | VanBlon | H04L 43/08 |
| 2019/0079640 A1* | 3/2019 | Page | G06T 11/60 |
| 2019/0098096 A1* | 3/2019 | Mocanu | H04L 67/02 |

* cited by examiner

TECHNIQUES FOR IMPROVING IMPLEMENTATION OF A REMOTE BROWSER WITHIN A LOCAL BROWSER

CROSS-REFERENCE TO RELATED APPLICATIONS

Not applicable.

BACKGROUND

Remote browsing relates to separating a user's browsing activity from their local networks and infrastructure. Such remote browsing often leverages virtualization technology to isolate the user's browsing activity. For example, a remote system can be executing a virtual machine or a container that is running a remote browser. The remote browser receives requests from a user to navigate to particular webpages. In response to the requests, the remote browser obtains and renders representations of the particular webpages so that the remote browser can send the representations of the particular webpages to the user's local computer. However, controlling the remote browser from a local browser in an intuitive manner is difficult. Accordingly, there is a need in the art to improve implementation of a remote browser within a local browser.

SUMMARY

The present disclosure relates generally to remote browsing, and more particularly to techniques for causing functions provided by a remote browser to be executed when functions provided by a local browser are requested.

In certain examples, a pair of browser helper objects (BHOs) are provided. The pair can include a local BHO communicatively coupled to a remote BHO. The local BHO can be installed on a local browser executing on a local system. The remote BHO can be installed on a remote browser executing on a remote system.

The local BHO can intercept a request for the local browser to perform a function. When the function is designated to be provided by the remote browser, the local BHO can (1) prevent the local browser from performing the function and (2) send a communication to the remote BHO to cause the remote browser to perform the function.

In some examples, the remote BHO can cause representations of webpages to be sent to the local browser without causing display of visual representations of functions provided by the remote browser. By not having such visual representations, the local BHO can use visual representations from the local browser as visual representations of functions provided by the remote browser.

Techniques described above can be provided as a system, method, or a transitory or non-transitory computer readable medium. For example, a system of one or more computing systems can be configured to perform particular operations or actions by virtue of having software, firmware, hardware, or a combination of them installed on the system that in operation causes or cause the system to perform the actions. One or more computer programs can be configured to cause an electronic device to perform particular operations or actions by virtue of including instructions that, when executed by the electronic device, cause the electronic device to perform the operations or actions.

One general aspect includes a method for causing functions provided by a remote browser to be executed when functions provided by a local browser are requested. The method can include: receiving, by a remote browser running on a remote system, from a local browser running on a local system, a request to view a webpage. The method can also include sending, by the remote browser, to the local browser, a representation of the webpage to be presented by the local browser. The method can also include receiving, by the remote browser, a communication indicating that a function provided by the local browser has been requested. The method can also include identifying, based upon the communication, a function provided by the remote browser, where the function provided by the remote browser corresponds to the function provided by the local browser. The method can also include in response to (1) receiving the communication and (2) identifying the function provided by the remote browser, executing, by the remote browser, the function provided by the remote browser. Other examples of this aspect include corresponding computer systems, electronic devices, apparatus, and computer programs recorded on one or more computer storage devices, each configured to perform the method.

Implementations can include one or more of the following features. The method where content received by the local browser from the remote browser does not include a visual representation corresponding to the function provided by the remote browser. The method where the communication is sent by the local browser to the remote browser while the local browser is presenting the representation of the webpage. The method further including: obtaining, by the remote browser, a hypertext markup language (HTML) document corresponding to the webpage. The method can also include rendering, by the remote browser, using the HTML document, the representation of the webpage. The method further including: in response to execution of the function provided by the remote browser, sending, by the remote browser, to the local browser, a representation of a second webpage to be presented by the local browser. The method further including: obtaining, by the remote browser, a HTML document corresponding to the second webpage. The method can also include rendering, by the remote browser, using the HTML document, the representation of the second webpage. The method further including: in response to execution of the function provided by the remote browser, sending, by the remote browser, to the local browser, a communication to cause the local browser to change at least a portion of what the local browser is presenting. The method where the function provided by the remote browser is the same as the function provided by the local browser. Implementations of the described techniques can include hardware, a method or process, or computer software on a computer-accessible medium.

One other general aspect includes a method, including: presenting, by a local browser, a representation of a webpage rendered by a remote browser. The method can also include while the local browser is presenting the representation of the webpage, receiving, by the local browser, user input corresponding to a request to execute a function provided by the local browser. The method can also include preventing, by the local browser, the function provided by the local browser from being performed by the local browser. The method can also include sending, by the local browser, to the remote browser, a communication indicating that the function provided by the local browser has been requested, where the communication causes the remote browser to execute a function corresponding to the function provided by the local browser. Other examples of this aspect include corresponding computer systems, electronic devices, apparatus, and computer programs recorded on one or more computer storage devices, each configured to perform the actions of the methods.

Implementations of the other general aspect can include one or more of the following features. The method where content sent by the remote browser for the local browser to present does not include a visual representation corresponding to the function executed by the remote browser. The method where the communication is sent by the local browser to the remote browser while the local browser is presenting the representation of the webpage. The method further including: receiving, by the local browser, a representation of a second webpage to be presented by the local browser, where the representation of the second webpage is sent to the local browser in response to execution of the function corresponding to the functions provided by the local browser. The method further including: receiving, by the local browser, a communication causing the local browser to change at least a portion of what the local browser is presenting. The method where the function executed by the remote browser is the same as the function provided by the local browser. The method further including: generating, by the local browser, the communication. The method further including: identifying a generic identification of the function provided by the local browser such that the generic identification is unrelated to the local browser, where the communication includes the generic identification. Implementations of the described techniques can include hardware, a method or process, or computer software on a computer-accessible medium.

DESCRIPTION OF THE FIGURES

For a better understanding of the various described examples, reference should be made to the detailed description below, in conjunction with the following drawings in which like reference numerals refer to corresponding parts throughout the figures.

DETAILED DESCRIPTION

The following description sets forth exemplary methods, parameters, and the like. It should be recognized, however, that such description is not intended as a limitation on the scope of the present disclosure but is instead provided as a description of exemplary examples.

The present disclosure relates generally to remote browsing, and more particularly to techniques for causing functions provided by a remote browser to be executed when functions provided by a local browser are requested. For example, a user activates a local web browser's back button while the local web browser is accessing a current URL to view contents of a remote web browser. In response to detecting activation of the back button, the local web browser transmits a corresponding "back" instruction to the remote web browser (without the local browser retrieving or rendering a URL previously retrieved using the local browser). As a result, the local web browser maintains display of the current URL and the remote web browser acts on the "back" instruction to retrieve and render the previously accessed URL.

In certain examples, a pair of browser helper objects (BHOs) are provided. The pair can include a local BHO communicatively coupled to a remote BHO. The local BHO can be installed on a local browser executing on a local system. The remote BHO can be installed on a remote browser executing on a remote system.

The local BHO can intercept a request for the local browser to perform a function. When the function is designated to be provided by the remote browser, the local BHO can (1) prevent the local browser from performing the function and (2) send a communication to the remote BHO to cause the remote browser to perform the function.

In some examples, the remote BHO can cause representations of webpages to be sent to the local browser without visual representations (e.g., a back button) of functions (e.g., a back function) provided by the remote browser. By not having such visual representations, the local BHO can use visual representations from the local browser as visual representations of functions provided by the remote browser.

Figure 1:
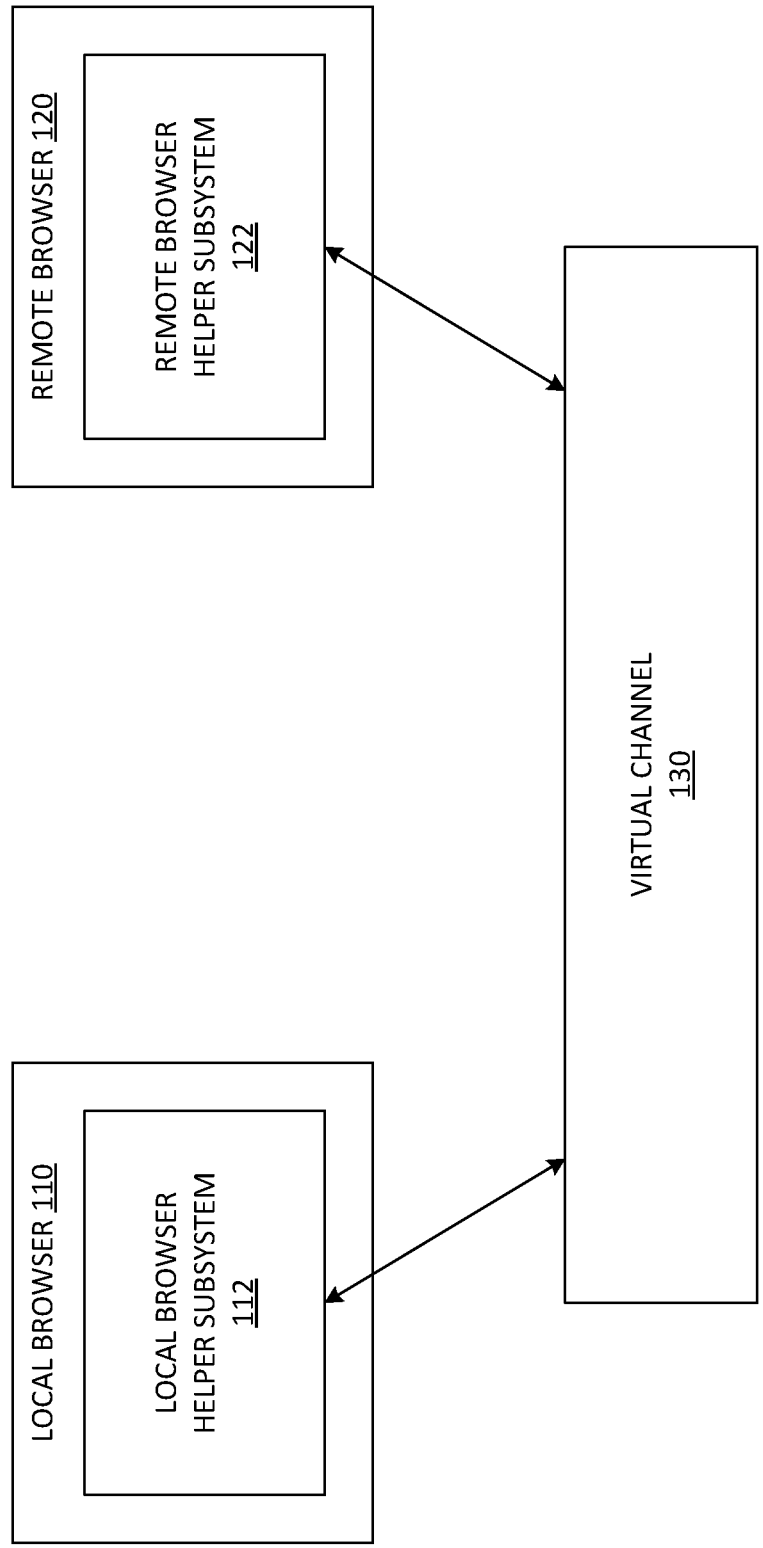
FIG. 1 depicts an example of a distributed environment according to certain examples described herein.

FIG. 1 depicts an example of a distributed environment according to certain examples described herein. The distributed environment includes local browser 110, remote browser 120, and virtual channel 130. Local browser 110 is communicatively coupled to remote browser 120 using virtual channel 130, as further discussed below.

Each of local browser 110 and remote browser 120 can be a web browser. In some examples, a web browser is a software application for retrieving, presenting, and/or traversing information resources (e.g., representations of webpages) on one or more networks (e.g., the Internet). Such information resources can be identified by a Uniform Resource Identifier (URI). Examples of information resources include a representation of a webpage, an image, a video, or other piece of content. Examples of browsers include Chrome™, Edge, Safari™, Opera™, and Firefox™.

The process to deliver a representation of a webpage to a web browser can begin when a web browser receives a user inputted URI (e.g., www.uspto.gov) into the web browser. In the case of URIs retrieved over the Hypertext Transfer Protocol (HTTP), Hypertext Markup Language (HTML) content and associated data (e.g., images, formatting information, or the like) can be received by the web browser to be transformed from markup to a displayable document (sometimes referred to as a rendered document, a rendered webpage, a representation of a webpage, or the like). Once transformed into the representation of the webpage, the web browser can (1) present the representation of the webpage (such as in the case of local browser 110) and/or (2) send the representation of the webpage to another web browser to be presented by the other web browser (such as in the case of remote browser 120).

In some examples, sending the representation of the webpage to another web browser can be performed as follows. A remoting protocol (e.g., PCoIP™, VMware Blast, etc.) session is established between a remote browser and a local browser. The remoting protocol session is then used to send the representation of the web page (e.g., image data, such as pixels from a framebuffer) from the remote browser to the local browser. In such examples, instead of receiving an actual web page, the local browser is receiving pixel data which it can use to display the web page that was rendered somewhere else. Similarly, the remoting protocol captures user input events (e.g., mouse clicks, etc.) at the local browser and sends the input events to the remote browser. This allows the user to click inside the representation of the webpage and information indication that the click occurred is sent to the remote browser to be executed by the remote browser.

In the example depicted in FIG. 1, local browser 110 includes (e.g., has installed thereon) a local browser helper object (BHO) 112, and remote browser 120 includes (e.g., has installed thereon) remote BHO 122. The pair of BHOs can be used to hook (e.g., receive) actions that occur on local browser 110.

In some examples, a BHO can be a dynamic-link library (DLL) module designed as a plugin for a web browser to provide additional functionality. Among other things, a BHO can typically (1) access a Document Object Model (DOM) of a webpage and (2) control navigation in the web browser. With BHOs, components (e.g., Component Object Model (COM) components) can be created that web browsers can load when the web browsers start up.

BHOs often run in the same memory context as the web browsers and can perform actions on available windows and modules of the web browsers. For example, local BHO 112 can detect an event (e.g., GoBack, GoFoward, Document-Complete, or the like) occurring on local browser 110. In response to detecting the event, local BHO 112 can (1) modify components of local browser 110 (e.g., a menu, a toolbar, or the like), (2) create windows to display additional information on a representation of a current webpage, (3) install hooks to monitor messages and action on local browser 110, or (4) the like. While BHOs are discussed herein, it should be recognized that alternatives can be used, such as browser extensions, plug-ins, HTML components, add-ons, or the like.

As briefly mentioned above, the distributed environment depicted in FIG. 1 can also include virtual channel 130. Virtual channel 130 can utilize one or more remote procedure calls (RPCs) to provide an asynchronous, callback driven communications channel between an applications running on a remote system and applications (e.g., a plugin) running on a local system. In some examples, virtual channel 130 references to a virtual channel of a remoting protocol (e.g., PCoIP or VMware Blast). In such examples, virtual channel 130 is a separate channel of the remoting protocol that is established to communicate information (e.g., information other than pixel data and user input events) between local browser 110 and remote browser 120. Virtual channel 130 can pass a hooked command generated and sent by local BHO 112 to remote BHO 122, and vice versa.

Figure 2:
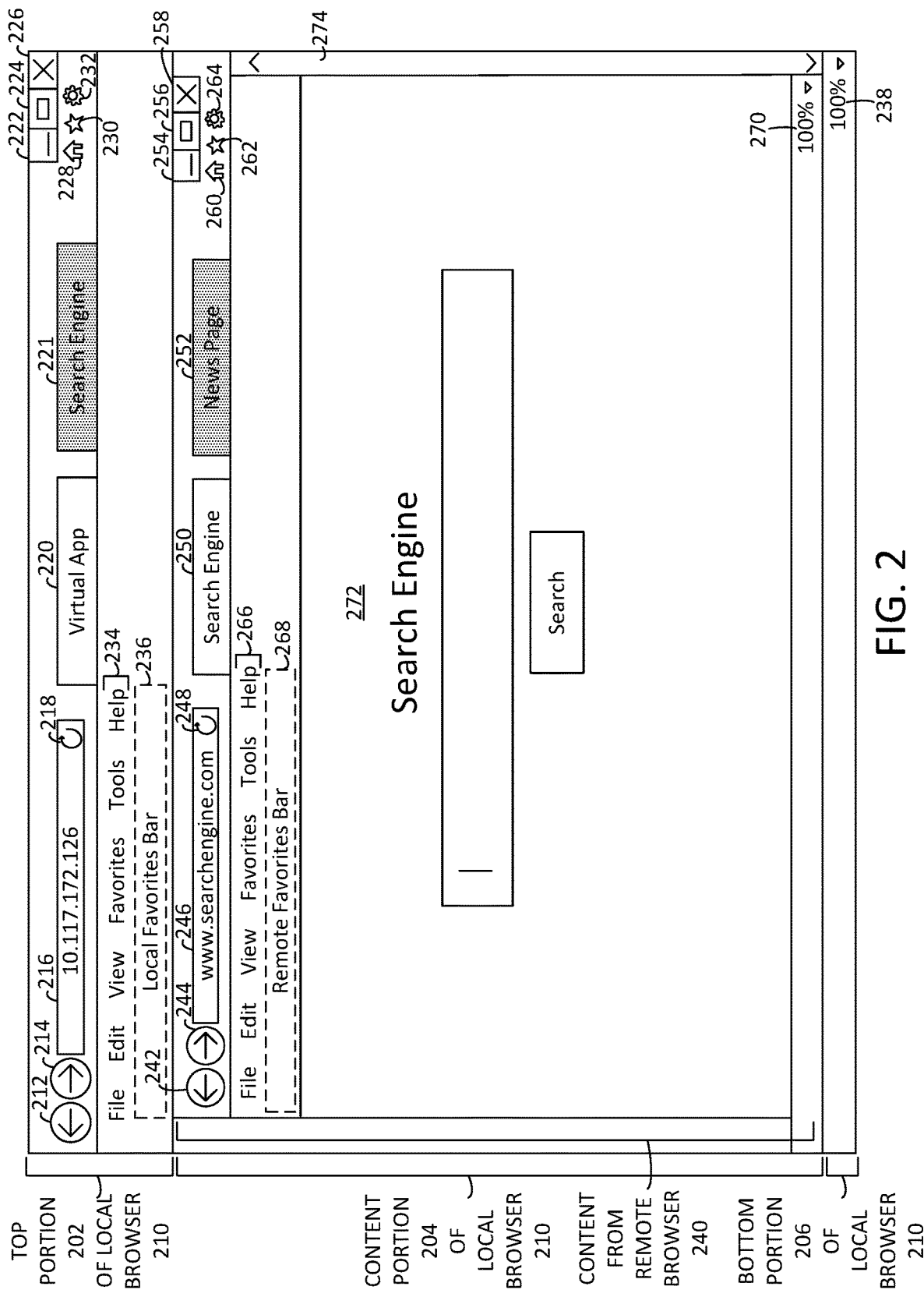
FIG. 2 depicts an example of a user interface with visual representations of functions performed by each of a local browser and a remote browser.

FIG. 2 depicts an example of a user interface with visual representations of functions performed by each of local browser 210 and remote browser 240. Local browser 210 can be running on a system separate from a system running remote browser 120. For example, local browser 210 can be running on a local system (e.g., local to the user, with a display), and remote browser 240 can be running on a remote system (e.g., remote from the user, without a display). In such an example, remote browser 240 can send content (e.g., a rendered web page) to local browser 210 to be displayed using local browser 210.

Local browser 210 can be an application that is displayed as a window. Local browser 210 can include multiple portions, such as top portion 202, content portion 204, and bottom portion 206; however, it should be recognized that a local browser can include more or fewer portions. In the example depicted in FIG. 2, each of top portion 202 and bottom portion 206 includes one or more representations of functions provided by local browser 210. It should be recognized that the functions visualized, the particular locations of the representations, and the physical appearance of the representations can be different than depicted in FIG. 2.

For exemplary purposes, some functions provided by local browser 210 will now be described. It should be recognized that more, fewer, or different functions can be provided by local browser 210. Top portion 202 includes back button 212 (e.g., a button conventionally used to navigate to a previous webpage viewed by local browser 210), forward button 214 (e.g., another button conventionally used to navigate to a previous webpage viewed by local browser 210), address bar 216 (e.g., an input area conventionally used to receive a user-inputted address to have local browser 210 navigate to the address), refresh button 218 (e.g., a button conventionally used to refresh a current webpage of local browser 210), a tab (such as tab 220 or tab 221, where tab 220 is active and tab 221 is not active (illustrated by shading)) (e.g., a label conventionally used to indicate a webpage currently being viewed, with the ability to depict other webpages that are not currently being viewed by local browser 210), minimize button 222 (e.g., a button conventionally used to cause a current window of local browser 210 to be minimized), maximize button 224 (e.g., a button conventionally used to cause a current window of local browser 210 to be maximized), exit button 226 (e.g., a button conventionally used to cause a current window of local browser 210 to be closed), home button 228 (e.g., a button conventionally used to cause local browser 210 to navigate to a particular webpage), favorites button 230 (e.g., a button conventionally used to view one or more webpages that a user has identified as favorites for local browser 210), setting button 232 (e.g., a button conventionally used to navigate to settings for local browser 210), menu bar 234 (e.g., one or more buttons, each button including one or more actions that can be performed by local browser 210), and local favorites bar 236 (e.g., one or more links to webpages that a user has identified to be included in favorites bar 236 for local browser 210). Bottom portion 206 includes zoom factor 238 (e.g., an indication conventionally used to identify an amount of zoom for content of local browser 210 and/or a button to modify the amount of zoom).

As briefly mentioned above, local browser 210 can include content portion 204. Content portion 204 can include content received from remote browser 240. In some examples, the content received from remote browser 240 can be associated with a URI that has been navigated to by local browser 210. For example, address bar 216 indicates that local browser 210 has navigated to URI "10.117.172.126", and tab 220 indicates that URI "10.117.172.126" corresponds to "Virtual App". As discussed above, the content can include a representation of a webpage, an image, a video, or other content that can be transferred from one computer system to another. In the example depicted in FIG. 2, the content includes a representation of remote browser 240 when remote browser 240 has navigated to a search engine webpage.

Similar to local browser 210, the representation of remote browser 240 can include multiple portions, including a top portion, a content portion, and a bottom portion; however, it should be recognized that the representation can include more or fewer portions. In the example depicted in FIG. 2, each of the top portion and the bottom portion of the representation includes one or more representations of functions provided by remote browser 240. For example, the top portion of remote browser 240 includes back button 242 (e.g., a button conventionally used to navigate to a previous webpage viewed by remote browser 240), forward button 244 (e.g., another button conventionally used to navigate to a previous webpage viewed by remote browser 240), address bar 246 (e.g., an input area conventionally used to receive a user-inputted address to have remote browser 240 navigate to the address), refresh button 248 (e.g., a button conventionally used to refresh a current webpage of remote browser 240), a tab (such as tab 250 or tab 252, where tab 250 is active and tab 252 is not active (illustrated by shading)) (e.g., a label conventionally used to indicate a webpage currently being viewed by remote browser 240, with the ability to depict other webpages that are not currently being viewed), minimize button 254 (e.g., a button conventionally used to cause a current window of remote browser 240 to be minimized), maximize button 256 (e.g., a button conventionally used to cause a current window of remote browser 240 to be maximized), exit button 258 (e.g., a button conventionally used to cause a current window of remote browser 240 to be closed), home button 260 (e.g., a button conventionally used to cause remote browser 240 to navigate to a particular webpage), favorites button 262 (e.g., a button conventionally used to view one or more webpages that a user has identified as favorites for remote browser 240), setting button 264 (e.g., a button conventionally used to navigate to settings for remote browser 240), menu bar 266 (e.g., one or more buttons, each button including one or more actions that can be performed by remote browser 240), and local favorites bar 280 (e.g., one or more links to webpages that a user has identified to be included in favorites bar 268 for remote browser 240). The bottom portion of remote browser 240 includes zoom factor 270 (e.g., an indication conventionally used to identify an amount of zoom for content of remote browser 240 and/or a button to modify the amount of zoom).

It should be recognized that the functions visualized, the particular locations of the representations, and the physical appearance of the representations can be different than depicted in FIG. 2. As depicted in FIG. 2, the representation of remote browser 240 includes the same representations as local browser 210 in their respective top and bottom portions. It should be recognized that each browser might have different representations. It should also be recognized that each browser can be a different type of browser, with a different appearance and/or types of functions. Examples of different types of browsers include Microsoft™ Internet Explorer™, Mozilla™ Firefox, Safari, Opera, and Google™ Chrome.

As depicted in FIG. 2, the content portion of remote browser 240 includes a representation of a webpage (referred to as webpage 272 herein), which corresponds to the search engine webpage. First tab 250 indicates that the content portion of remote browser 240 is "Search Engine". Remote browser 240 also has second tab 252, which indicates another location to which remote browser 240 has navigated. Second tab 252 indicated that the other locations is "News Page". A user can have remote browser 240 switch to "News Page" by selecting second tab 252.

Local browser 210 and/or the representation of remote browser 240 can include scroll bar 274. Scroll bar 274 can allow a user to navigate content of a browser. For example, when scroll bar 274 is provided by remote browser 240, scroll bar 274 can navigate through content of remote browser 240, such as the representation of the search engine webpage. When both browsers include a scroll bar, there can be two scroll bars (not illustrated).

As can be seen in FIG. 2, when a representation of a web browser is presented within a local browser, many representations of functions can be duplicated between local browser 210 and remote browser 240 such that a user can become confused regarding which representations of functions apply to which browser and what would happen when particular functions are executed. Therefore, some examples described herein are meant to reduce the confusion with having multiple representations for particular functions by removing at least some representations for remote browser 240 and having at least some representations (e.g., corresponding representations) for local browser 210 control remote browser 240 rather than local browser 210. For example, back button 212 can be reconfigured such that when activated, it causes remote browser 240 to navigate to a representation of a webpage corresponding to a webpage previously retrieved and rendered by remote browser 240. Thus, user activation of back button 212 and back button 242 both cause remote web browser 240 to transmit a representation of a webpage previously rendered by remote browser 240 for display by local web browser 210.

FIGS. 3A-3K depict an example of a flow through a user interface with a remote browser within a local browser according to certain examples described herein. In the example depicted in FIGS. 3A-3K, representations of functions performed by local browser 310 in top portion 302 and bottom portion 306 can be the same or similar as described above for FIG. 2 with representations performed by local browser 210 in top portion 202 and bottom portion 306.

Figure 3A:
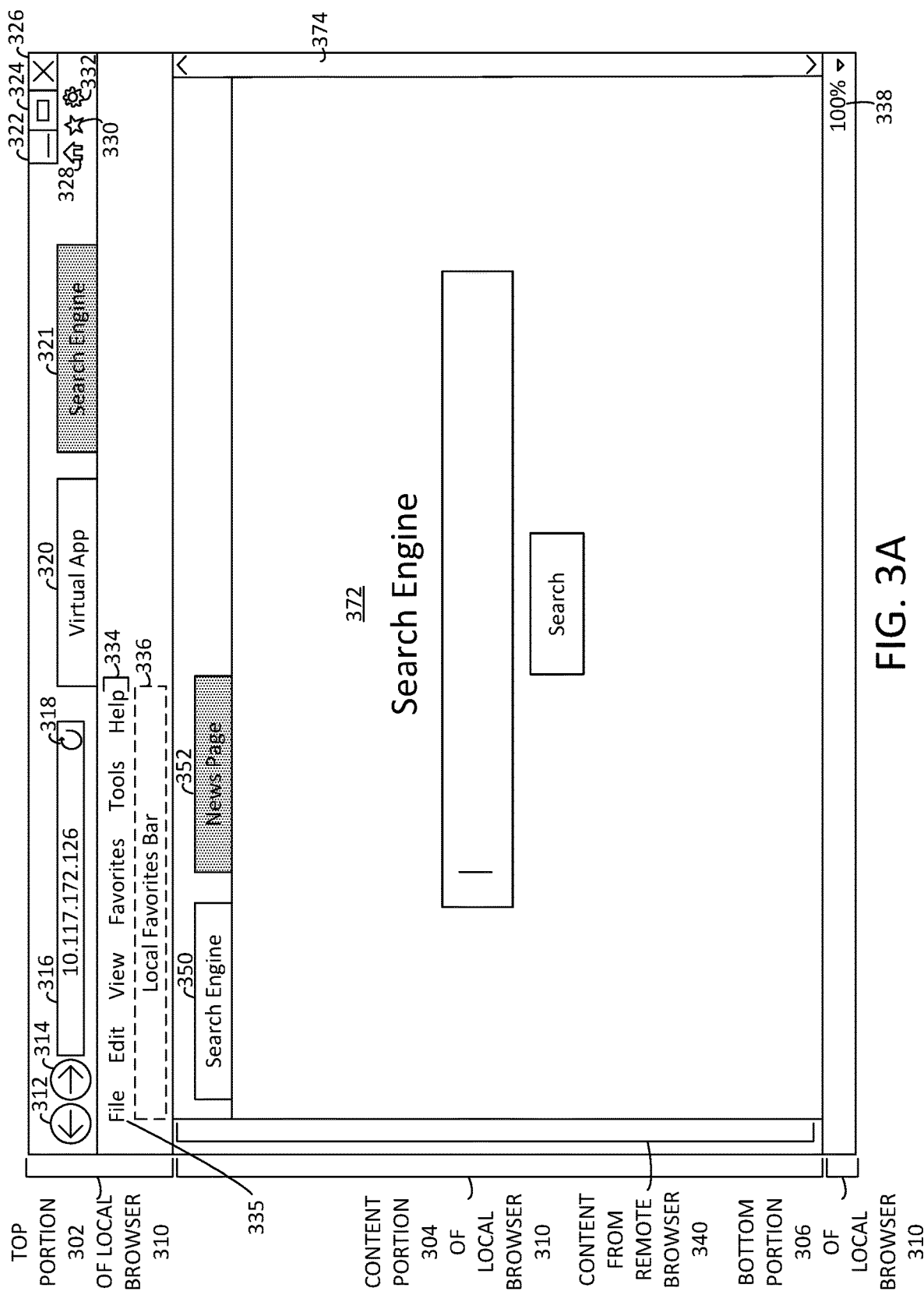
FIGS. 3A-3K depict an example of a flow through a user interface with a remote browser within a local browser according to certain examples described herein.

FIG. 3A depicts an example of the user interface at a first time. In the example depicted in FIG. 3A, content portion 304 of local browser 310 includes content received from remote browser 340 when a local browser 310 received a user request to navigate to URI "10.117.172.126". The content received from remote browser 340 can be a representation of remote browser 340, the representation corresponding to a search engine webpage.

However, unlike as depicted in FIG. 2, the example depicted in FIG. 3A does not include at least some representations of functions configured to be performed by remote browser 340, including at least some of a top portion and a bottom portion of the representation. Instead, as depicted in FIG. 3A, the representation of remote browser 340 includes a subset that is fewer than the full set of representations of functions that would be presented on remote browser 340 when remote browser 340 were displayed on a remote system. For example, the representation of remote browser 340 depicted in FIG. 3A includes a representation of a webpage (referred to as webpage 372 herein) and scroll bar 374. Some representations of functions configured to be performed by remote browser 340 might not be displayed within local browser 310, such as back button 242, among others. The other representations can be hidden or not provided.

In some examples, the representation of remote browser 340 can include a tab row, comprising first tab 350 and second tab 352, where first tab 350 is active and tab second tab 352 is not active (illustrated by shading). It should be recognized that the tab row can be provided by remote browser 340 and include more or fewer tabs than illustrated in FIG. 3A. When the representation of remote browser 340 includes the tab row, the tab row can appear just as it would in remote browser 340.

In other examples, a virtual tab row can be generated to display tab information (e.g., a representation of first tab 350 and a representation of second tab 352). The virtual tab row can be generated by a remote BHO (e.g., remote BHO 122) to be displayed with content from remote browser 340. For example, the virtual tab row can be placed inside an HTML page that is sent from remote browser 340 to local browser 310. The virtual tab row can provide consistency across different types of browsers such that regardless of a type of browser for a remote browser, the virtual tab row can look the same.

In some examples, the remote BHO can identify one or more functions performed by remote browser 340 that have corresponding representations in local browser 310. The remote BHO can then determine not to include representations of the one or more functions in content sent to local browser 310. Instead, corresponding representations in local browser 310 can be configured to send instructions to remote browser 340 instead of execute functions by local browser 310, as further discussed in FIGS. 4-8. The remaining discussion for FIGS. 3B-3K will concentrate on user interface aspects of this disclosure. The particular techniques used to make the user interface aspects function properly are further discussed in FIGS. 4-8.

Figure 3B:
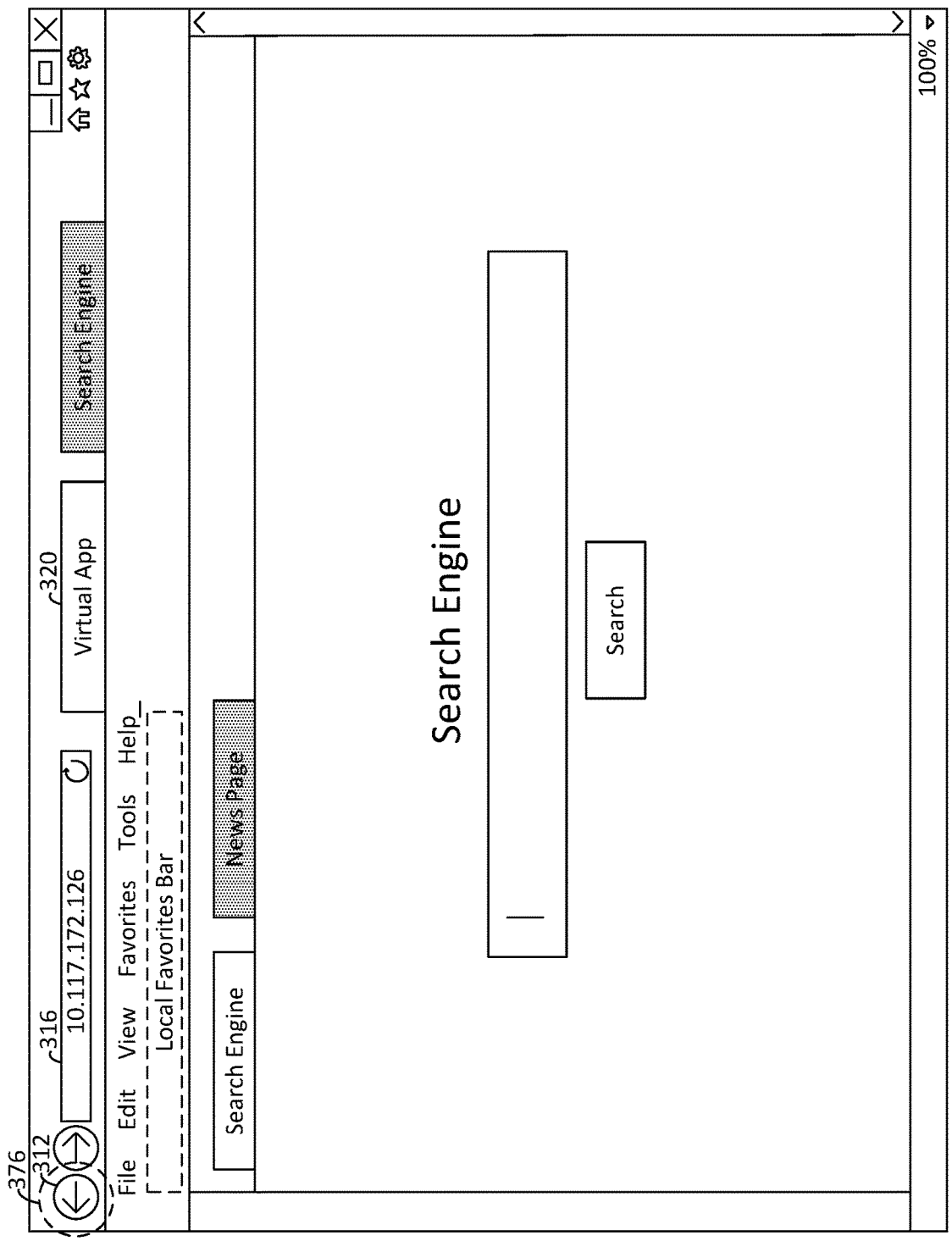

FIG. 3B depicts an example of the user interface at a second time. In the example depicted in FIG. 3B, local browser 310 receives a user selection of back button 312 to request for a previous webpage. Back button 312 can be included in top portion 302 of local browser 310. The selection of back button 312 is illustrated by dotted circle 376. The selection can be by any technique, such as a mouse click, a finger tap, input of a keyboard key, a verbal command, or the like.

In response to detecting selection of back button 312, a local BHO (e.g., local BHO 112) of local browser 310 can determine (1) whether a function corresponding to back button 312 is a function that is configured to be performed by remote browser 340 and (2) if the function is configured to be performed by remote browser 340, whether a representation of a webpage corresponding to remote browser 340 is currently being displayed. When a representation of a webpage corresponding to remote browser 340 is not currently being displayed (e.g., a representation of a webpage corresponding to remote browser 340 is either in a different tab or not navigated to at all), the local BHO can allow/cause the function corresponding to back button 312 to be executed by local browser 310. Causing the function corresponding to back button 312 to be executed by local browser 310 causes local browser 310 to navigate away from the current webpage displayed in tab 320 to display a representation of a webpage that was previously rendered by local browser 310. Navigating away from the current webpage includes, for example, updating (changing) display of the URI being accessed in URI display area 316.

When a representation of a webpage corresponding to remote browser 340 is currently being displayed, the local BHO can prevent (or cancel or forgo) the function corresponding to back button 312 from being executed by local browser 310. Instead of the function corresponding to back button 312 be executed by local browser 310, the local BHO can cause a corresponding function to be performed by remote browser 340 by sending a request to remote browser 340. In some examples, the request can be sent to a remote BHO (e.g., remote BHO 122). The request can indicate selection of back button 312. For example, the request can include an indication of back button 312, an indication of a generic back function that corresponds to back button 312, an indication of the corresponding function to be performed by remote browser 340, or the like. As a result, the technique forgoes updating (changing) display of the URI being accessed in URI display area 316.

Figure 3C:
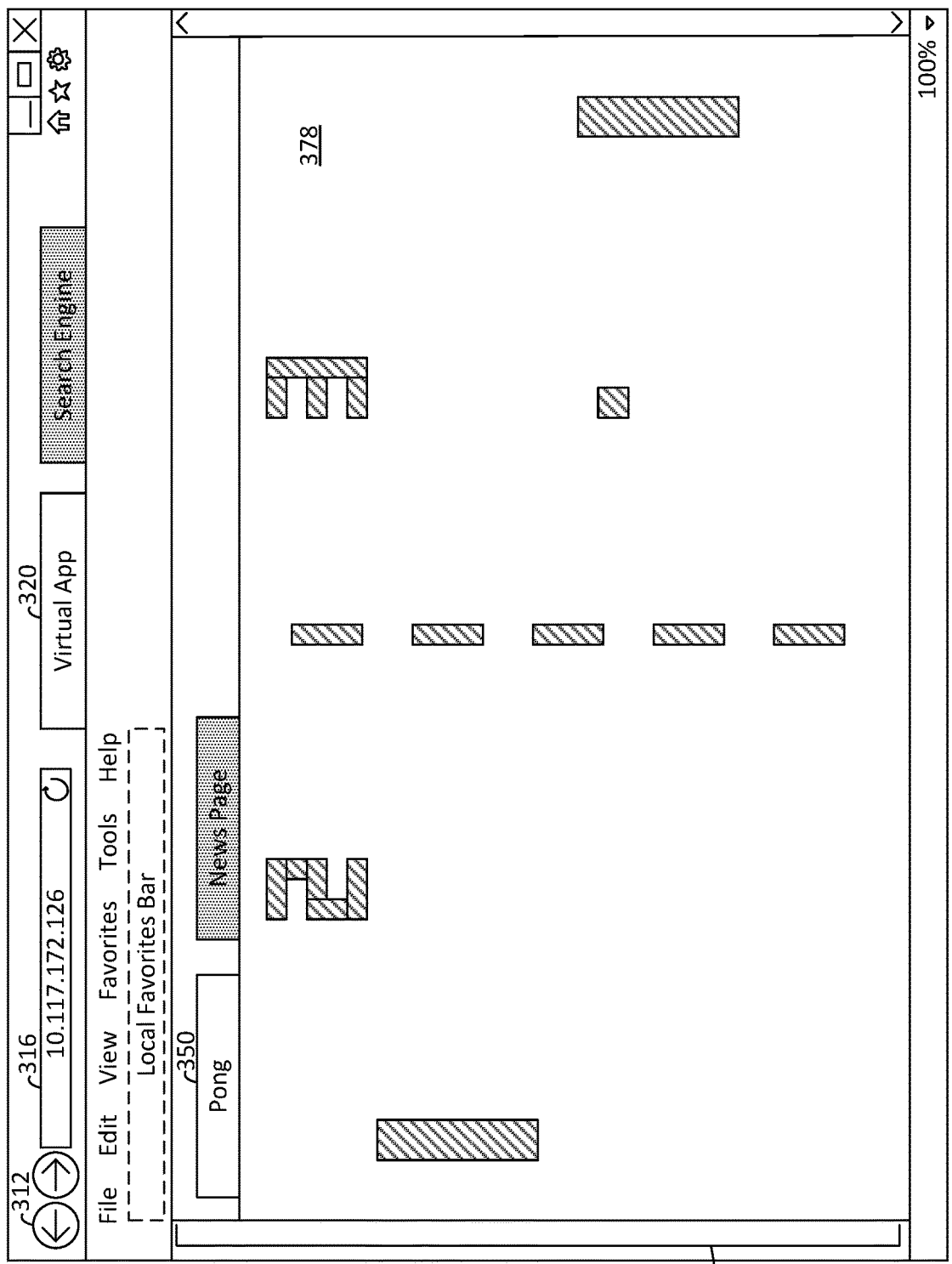

FIG. 3C depicts an example of the user interface at a third time. The example depicted in FIG. 3C can occur after remote browser 340 received the request discussed above for FIG. 3B. In response to receiving the request, remote browser 340 (1) determined a webpage corresponding to a previous webpage based upon a history of webpages accessed using remote browser 340 and (2) sent a representation of remote browser 340 including a representation of the webpage corresponding to the previous webpage to local browser 310 for display. The representation of remote browser 340 can be without the representations of the one or more functions of remote browser 340 that have been identified to have corresponding representations in local browser 310.

As depicted in FIG. 3C, content from remote browser 340 can include a pong game (e.g., webpage 378). In addition to the pong game, the content can include one or more tabs, including first tab 350 and second tab 352. First tab 350 in FIG. 3C includes "Pong" because the pong game is what is displayed, as opposed to first tab 350 in FIG. 3B including "Search Engine" because a representation of a search engine webpage is what is being displayed in FIG. 3B.

Figure 3D:
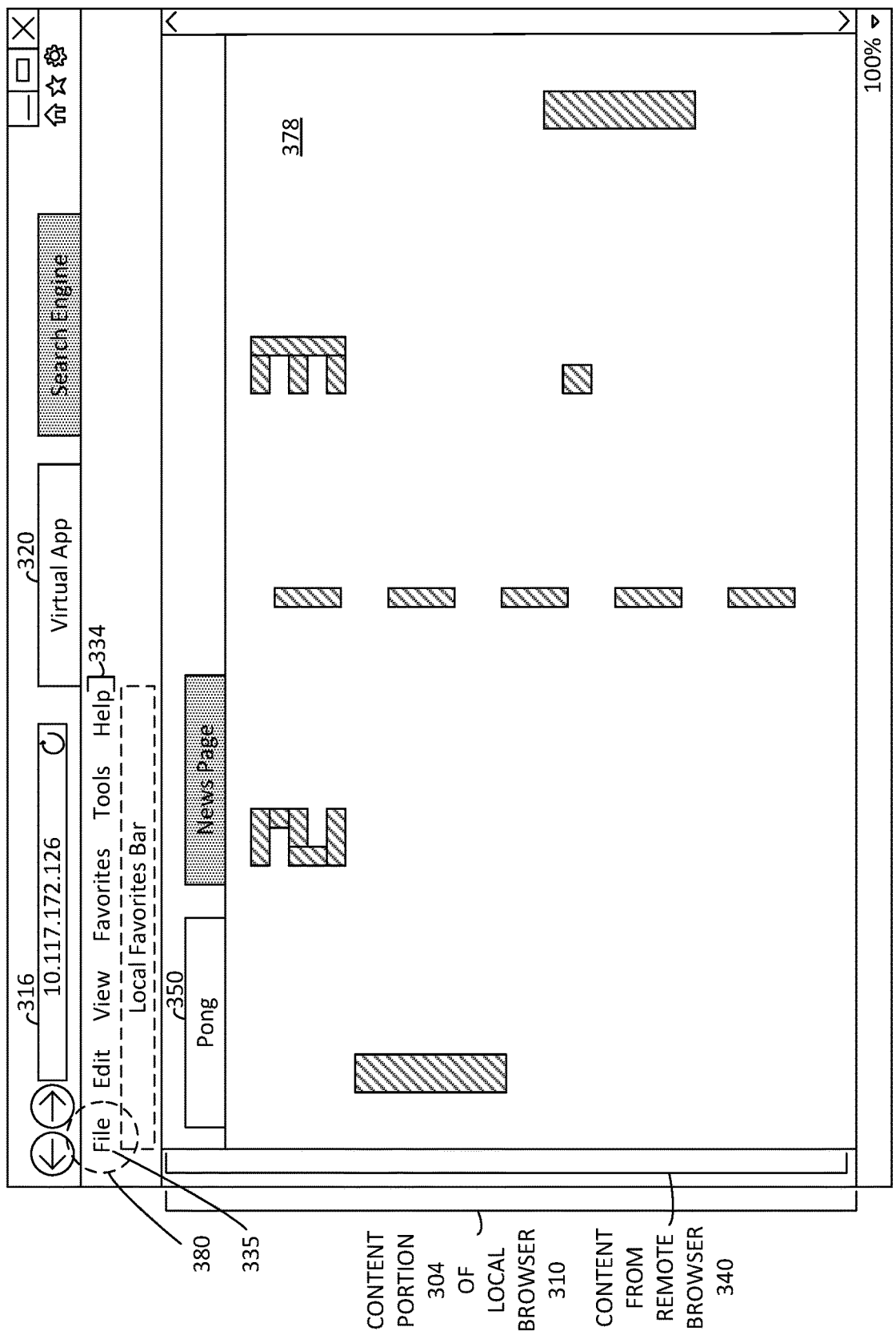

FIG. 3D depicts an example of the user interface at a fourth time. In the example depicted in FIG. 3D, local browser 310 receives user selection of file option 335 in menu bar 334 to request one or more options related to file option 335. File option 335 can be included in top portion 302 of local browser 310. The selection of file option 335 is illustrated by dotted circle 380. The selection can be by any technique, such as a mouse click, a finger tap, input of a keyboard key, a verbal command, or the like.

In response to detecting selection of file option 335, the local browser helper of local browser 310 determines (1) whether a function corresponding to file option 335 is a function that is configured to be performed by remote browser 340 and (2) if the function is configured to be performed by remote browser 340, whether a representation of a webpage corresponding to remote browser 340 is currently being displayed (or active). In some examples, the determination whether a function corresponding to file option 335 is a function that is configured to be performed by remote browser 340 can be based upon a type of browser for local browser 310 and a type of browser for remote browser 340. For example, when the type of browser for local browser 310 is the same as the type of browser for remote browser 340, file option 335 is configured to be performed by local browser 310. When the type of browser for local browser 310 is not the same as the type of browser for remote browser 340, file option 335 is configured to be performed by remote browser 340.

In the case of file option 335 as depicted in FIG. 3D, the function corresponding to file option 335 can be configured to be performed by local browser 310 even when a representation of a webpage corresponding to remote browser 340 is currently being displayed. Accordingly, the local BHO can allow/cause file option 335 to be executed by local browser 310. In other examples, file option 335 can be performed by remote browser 340. In such examples, a similar technique as described above for back button 312 is performed.

Figure 3E:
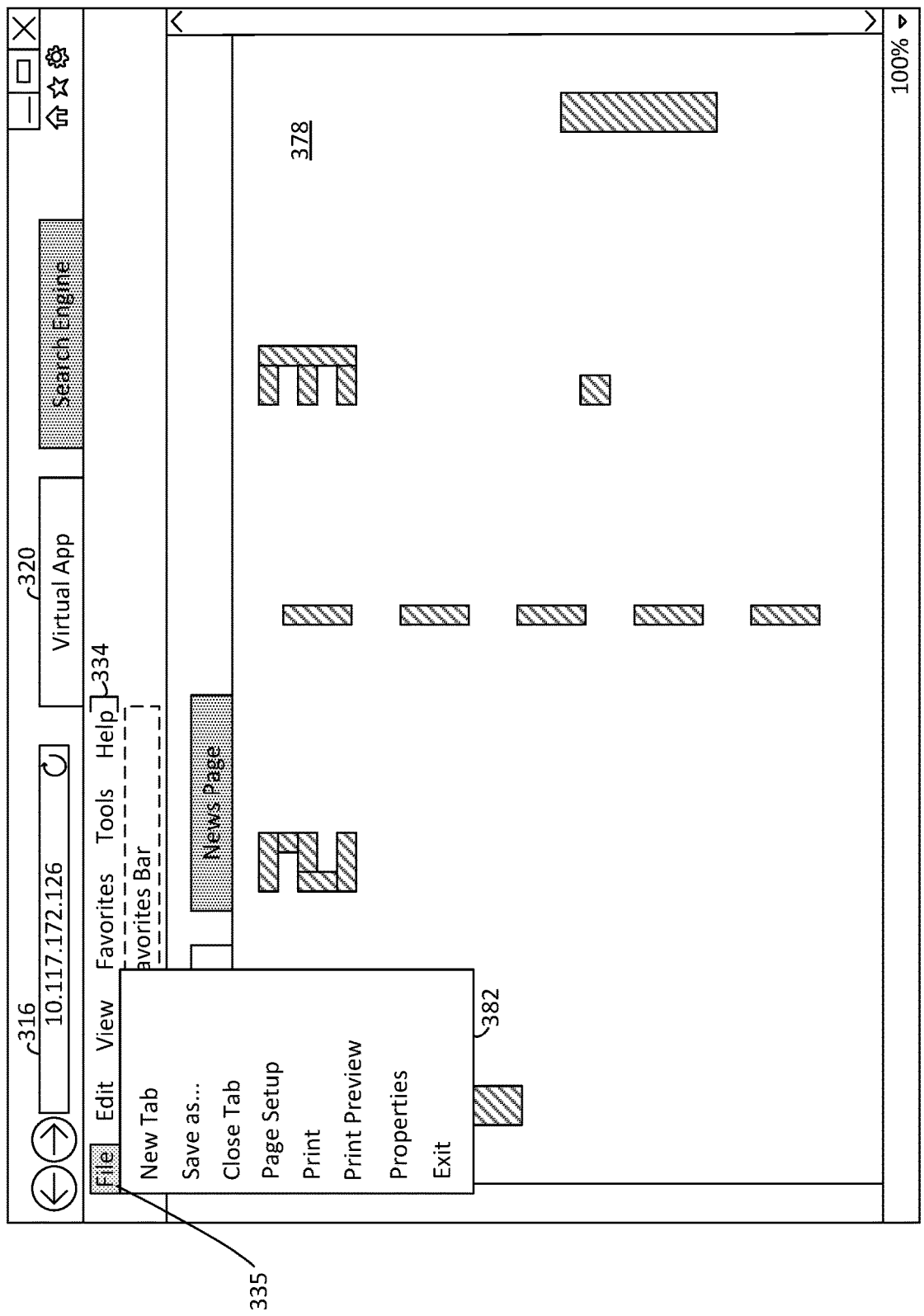

FIG. 3E depicts an example of the user interface at a fifth time. The example depicted in FIG. 3E can occur after the local BHO of local browser 310 received the request discussed above for FIG. 3D. In response to receiving the request, the local BHO determined/caused to have local browser 310 perform the request. To perform the request, local browser 310 can display menu 382 with one or more options associated with file option 335.

Figure 3F:
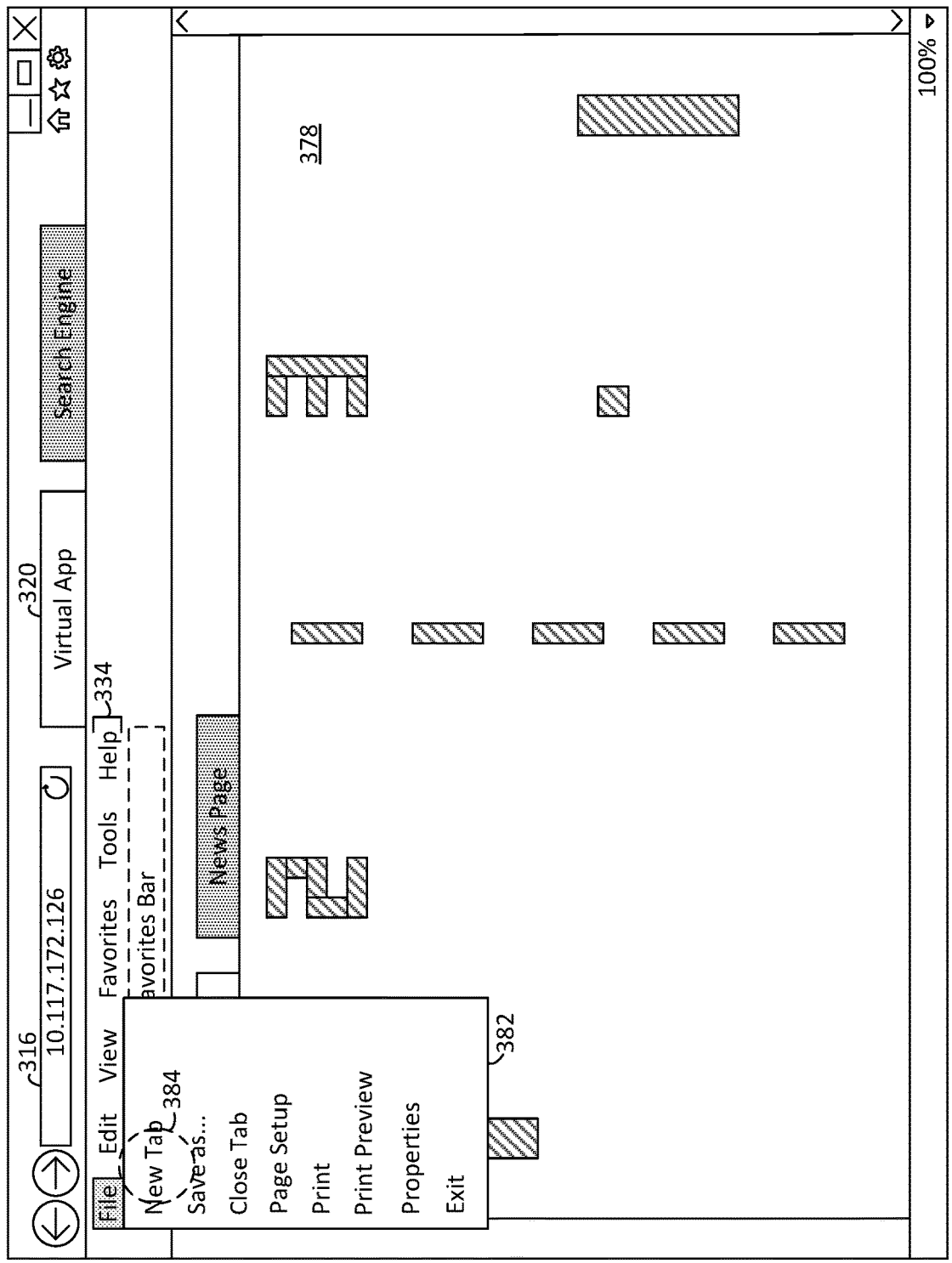

FIG. 3F depicts an example of the user interface at a sixth time. In the example depicted in FIG. 3F, local browser 310 detects user selection of a new tab option in menu 382 to request for a new tab. Menu 382 is part of local browser 310. The selection of the new option is illustrated by dotted circle 384. The selection can be by any technique, such as a mouse click, a finger tap, input of a keyboard key, a verbal command, or the like.

In response to detecting the selection of the new tab option, the local BHO determines (1) whether a function corresponding to the new tab option is a function that is configured to be performed by remote browser 340 and (2) if the function is configured to be performed by remote browser 340, whether a representation of a webpage corresponding to remote browser 340 is currently being displayed (or active). When a representation of a webpage corresponding to remote browser 340 is not currently being displayed (e.g., a representation of a webpage corresponding to remote browser 340 is either in a different tab or not navigated to at all), the local BHO can allow/cause the function corresponding to the new tab option to be executed by local browser 310. When a representation of a webpage corresponding to remote browser 340 is currently being displayed (or active), the local BHO prevents the new tab option from being executed by local browser 310.

Instead of having the function corresponding to the new tab option be executed by local browser 310, the local BHO causes a corresponding function to be performed by remote browser 340 by sending a request to remote browser 340. In some examples, the request can be sent to the remote BHO. The request can indicate selection of the new tab option. For example, the request can include an indication of the new tab option, an indication of a generic new tab function that corresponds to the new tab option, an indication of the corresponding function to be performed by remote browser 340, or the like.

Figure 3G:
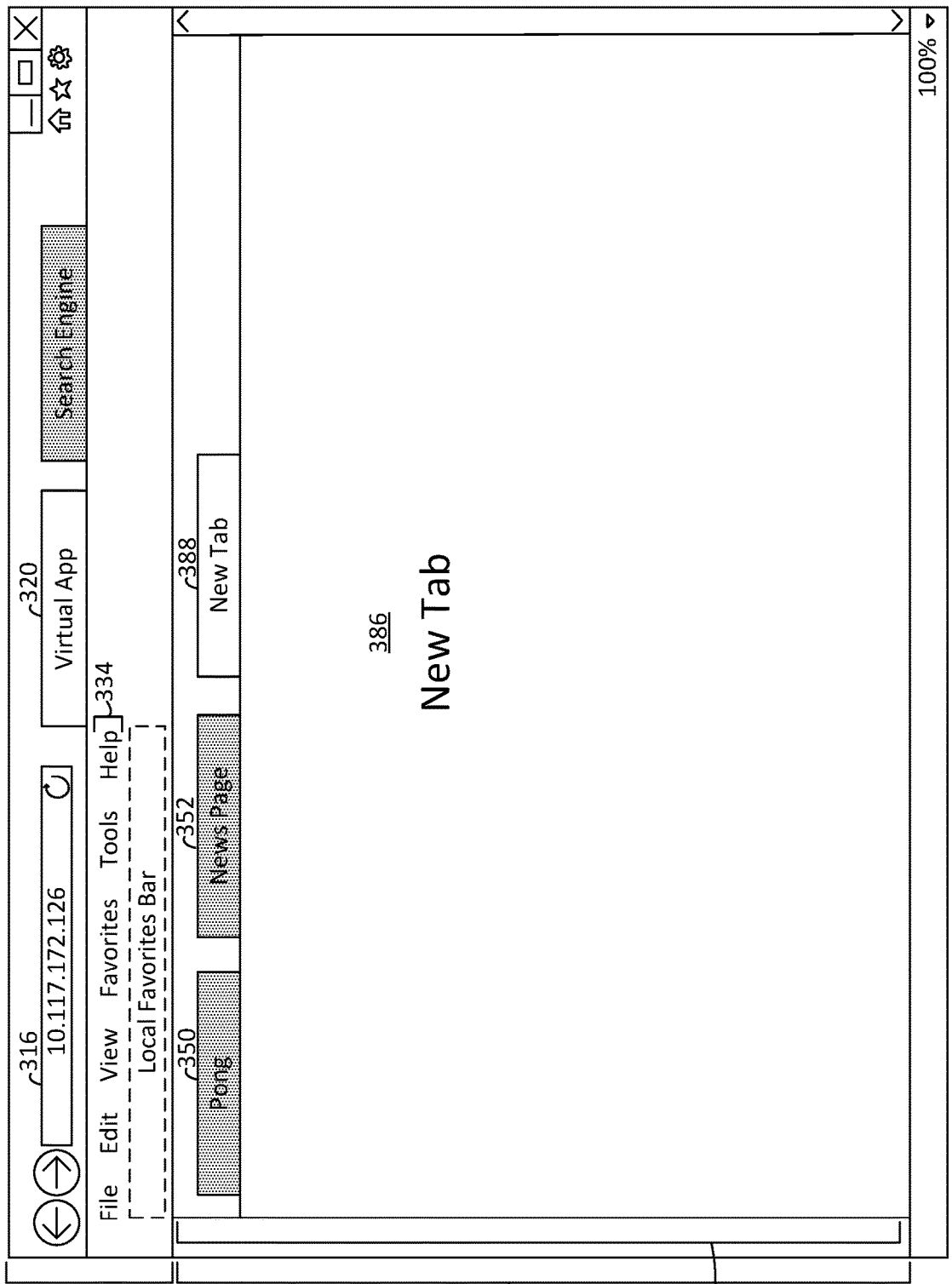

FIG. 3G depicts an example of the user interface at a seventh time. The example depicted in FIG. 3G can occur after remote browser 340 received the request discussed above for FIG. 3F. In response to receiving the request, remote browser 340 created a new tab (e.g., new tab 388) in remote browser 340 and does not create a new tab in the local browser 310.

FIGS. 3H-3K depict examples of the user interface when changing tabs of local browser 310. Such examples illustrate that operations can perform a different function depending on what tab is currently active (e.g., a tab of local browser 310 associated with a remote browser or a tab of local browser 310 not associated with a remote browser).

Figure 3H:
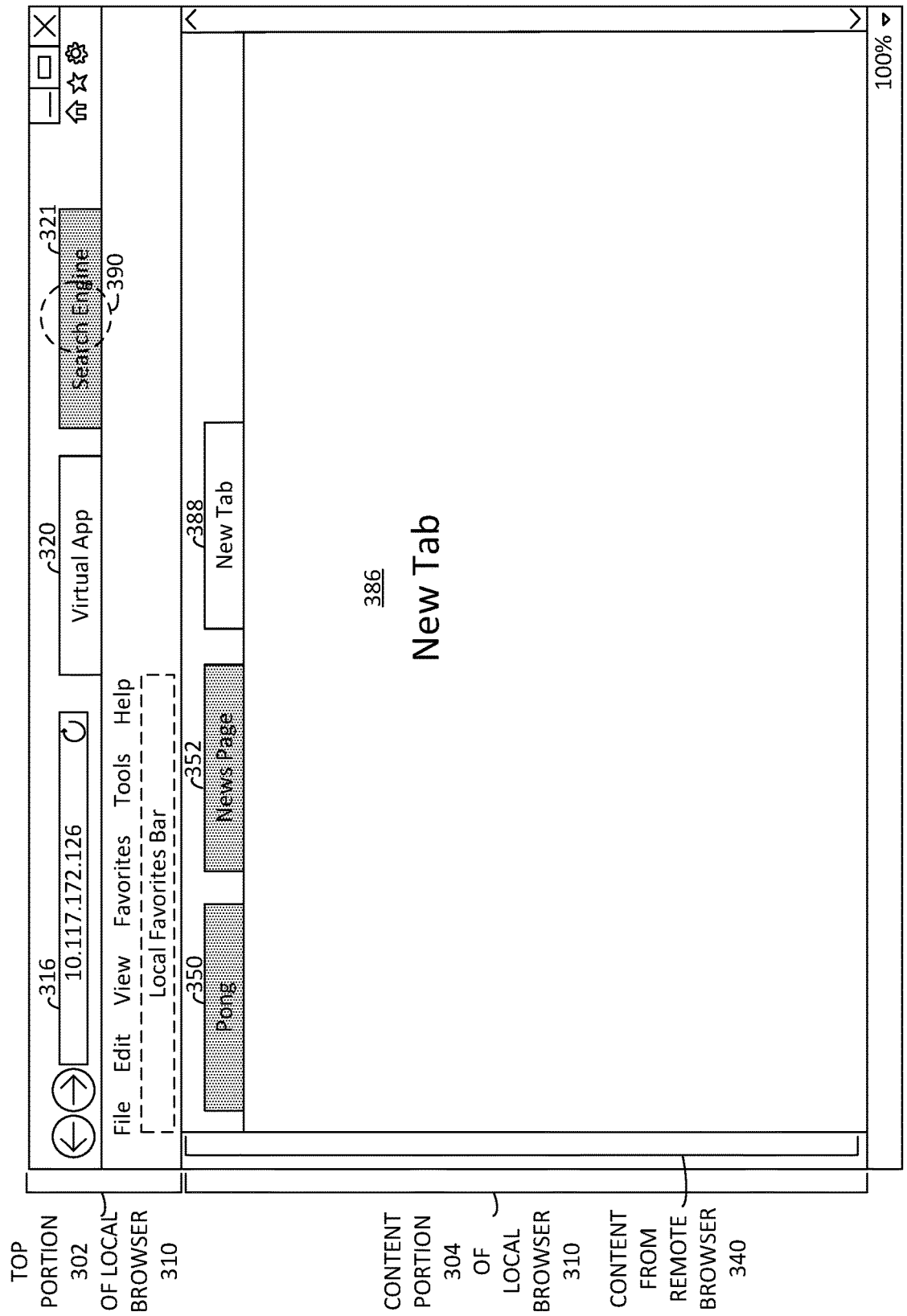

FIG. 3H depicts local browser 310 receiving a selection of tab 321 (which is currently inactive) to request for a web page associated with tab 321 to become active. As discussed above tab 321 is included in top portion 302 of local browser 310. The selection of tab 321 is illustrated by dotted circle 390. The selection can be by any technique, such as a mouse click, a finger tap, input of a keyboard key, a verbal command, or the like.

Figure 3I:
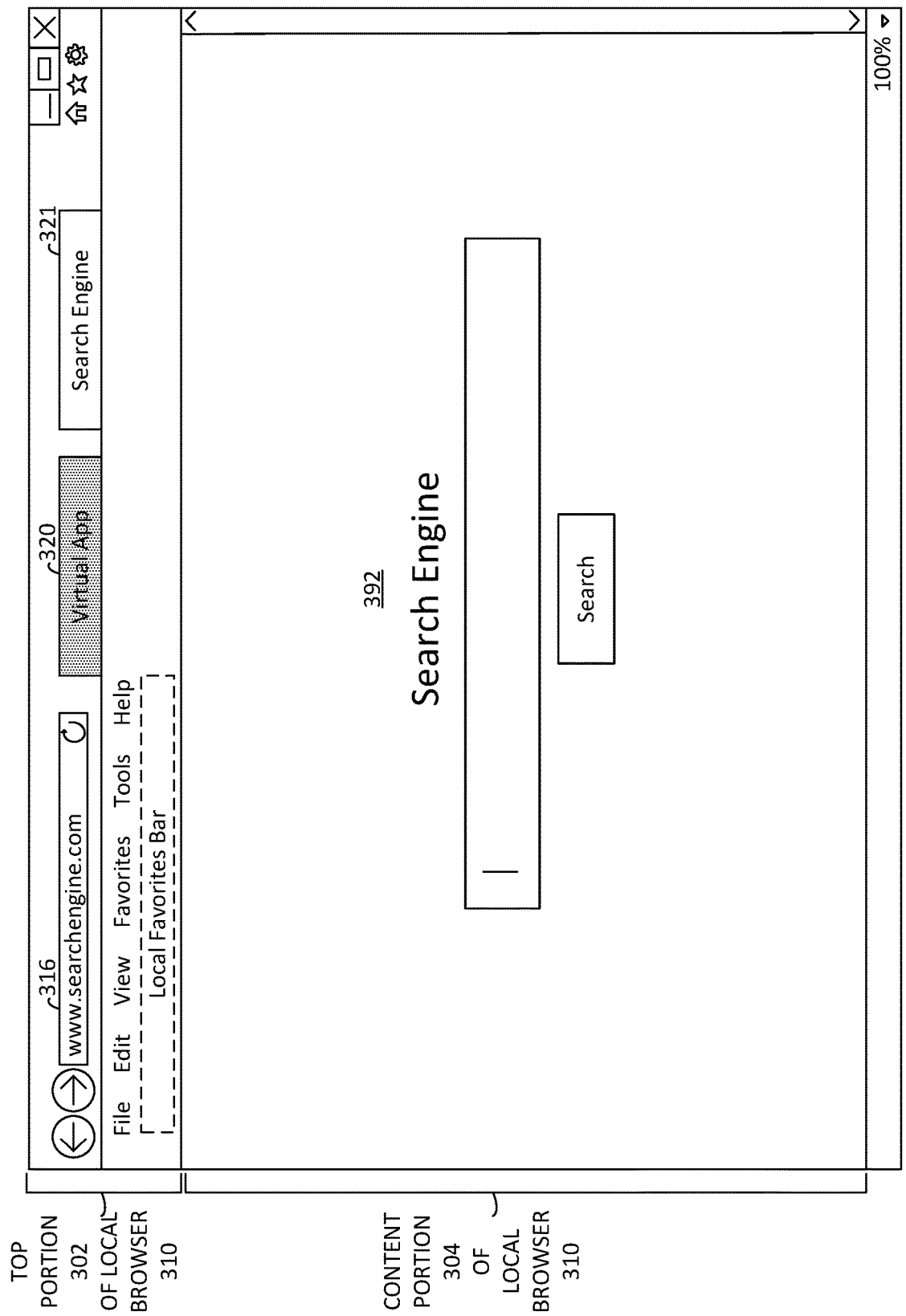

FIG. 3I depicts an example of the user interface at an eighth time. The example depicted in FIG. 3I can occur after local browser 310 received the selection of tab 321 discussed above for FIG. 3H. In response to receiving the selection of tab 321, local browser 310 (1) determined a webpage corresponding to tab 321 (e.g., webpage 392) and (2) displayed webpage 392.

As depicted in FIG. 3I, web page 392 is a search engine with a URL of "www.searchengine.com" (as illustrated in URI display area 316). Tab 321 in FIG. 3I includes "Search Engine" because the search engine is what is displayed. It should be recognized that content from remote browser 340 is no longer displayed by local browser 310.

Figure 3J:
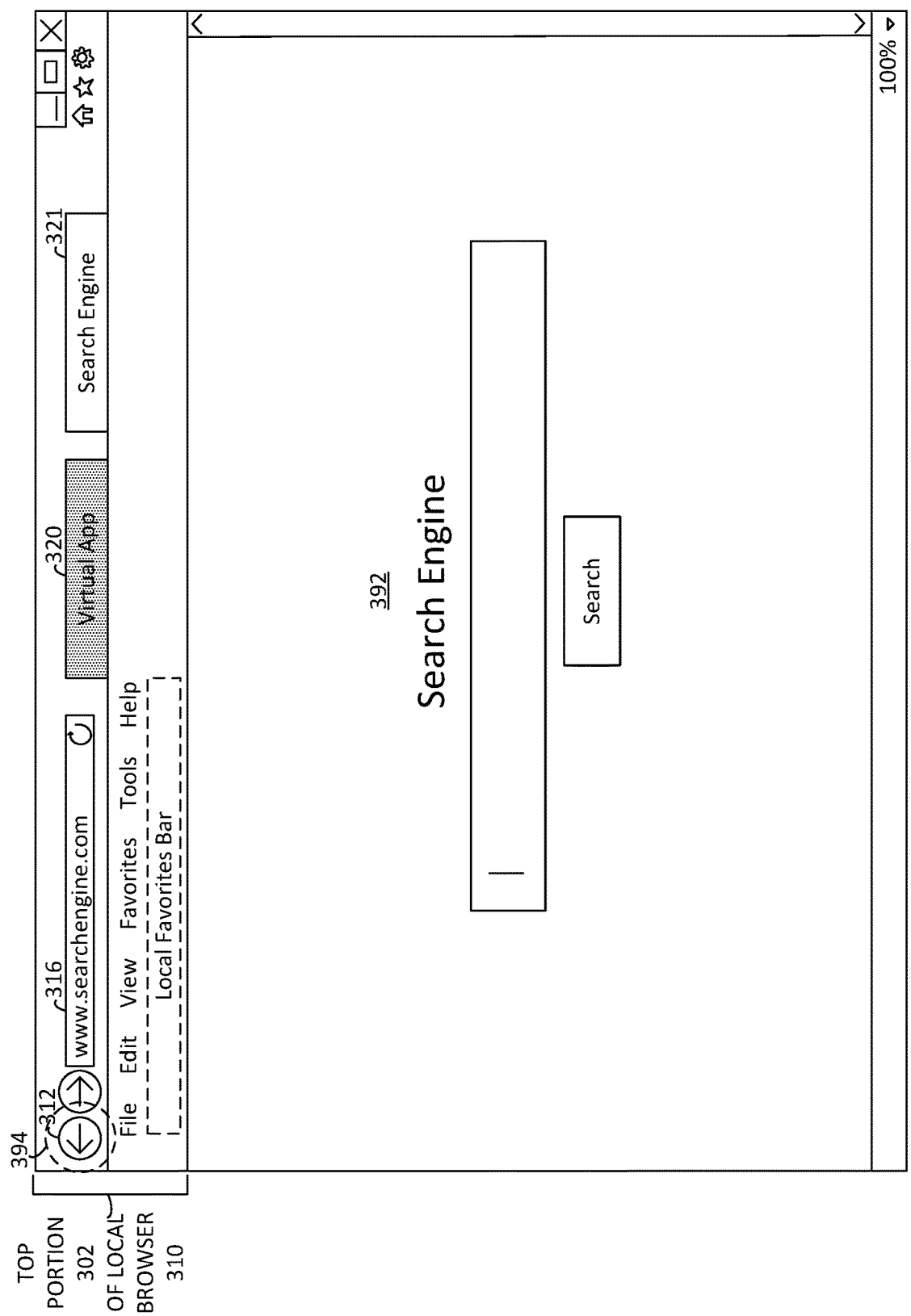

FIG. 3J depicts local browser 310 receiving a selection of back button 312 to request for a previous webpage. Back button 312 can be included in top portion 302 of local browser 310. The selection of back button 312 is illustrated by dotted circle 394. The selection can be by any technique, such as a mouse click, a finger tap, input of a keyboard key, a verbal command, or the like.

In response to detecting selection of back button 312, a local BHO (e.g., local BHO 112) of local browser 310 can determine (1) whether a function corresponding to back button 312 is a function that is configured to be performed by remote browser 340 and (2) if the function is configured to be performed by remote browser 340, whether a representation of a webpage corresponding to remote browser 340 is currently being displayed. When a representation of a webpage corresponding to remote browser 340 is not currently being displayed (e.g., a representation of a webpage corresponding to remote browser 340 is either in a different tab or not navigated to at all), the local BHO can allow/cause the function corresponding to back button 312 to be executed by local browser 310 (and forgoing sending a request to any remote browser (e.g., remote browser 340)). Causing the function corresponding to back button 312 to be executed by local browser 310 causes local browser 310 to navigate away from a representation of the current webpage displayed in tab 320 to display content that was previously displayed by local browser 310, as illustrated in FIG. 3K.

Figure 3K:
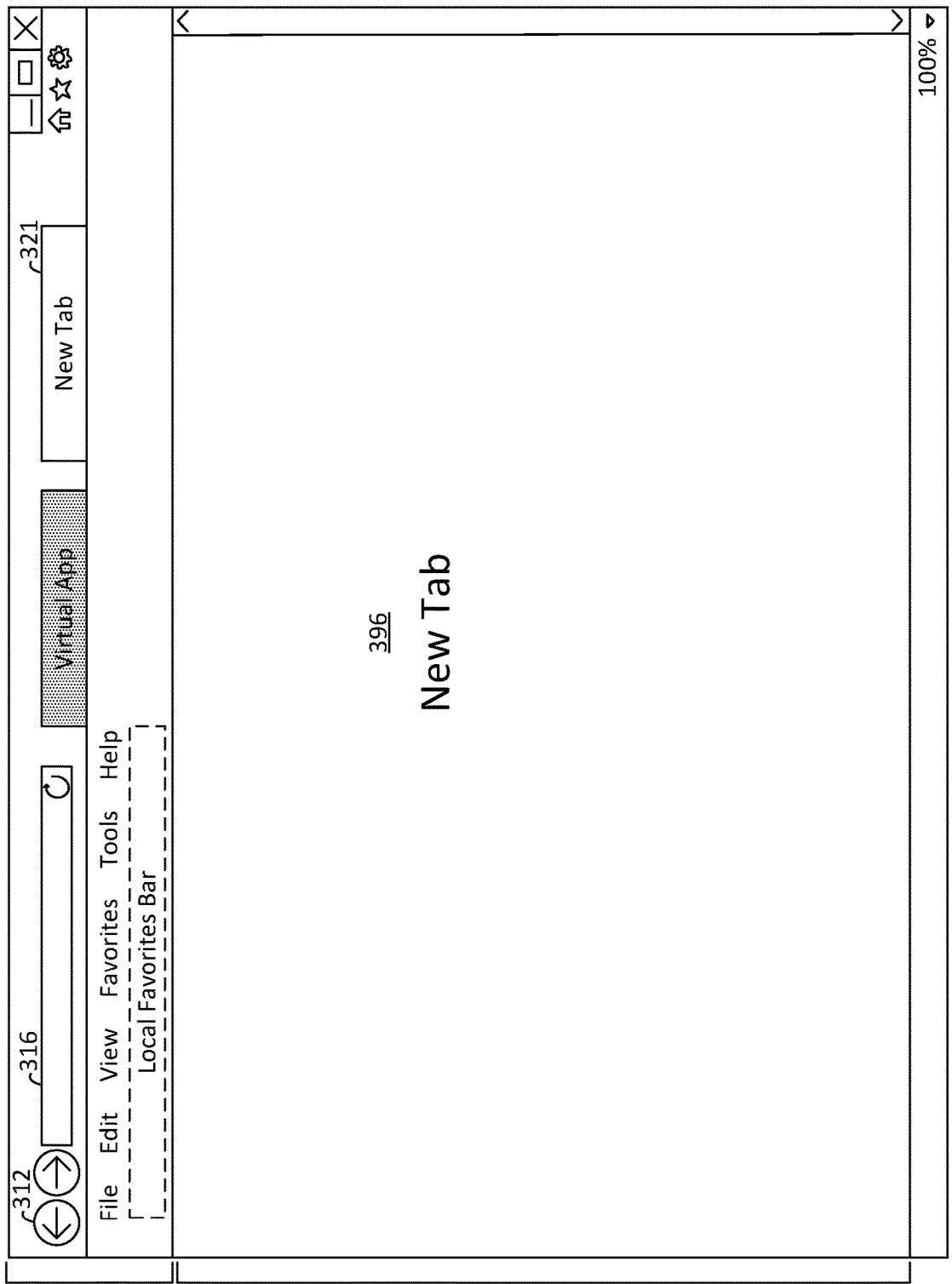

FIG. 3K depicts local browser 310 at a ninth time. The example depicted in FIG. 3K can occur after local browser 310 received the selection of back button 312 discussed above for FIG. 3J. In response to receiving the selection of back button 312, local browser 310 (1) determined content previously displayed by local browser 310 and (2) displayed the content.

As depicted in FIG. 3K, the content is new tab page 396. New tab page 396 represents a state of local browser 310 when local browser 310 has not yet navigated to a web page for a particular tab (e.g., tab 321). New tab page 396 does not have a URL (as illustrated in URI display area 316). Tab 321 in FIG. 3K includes "New Tab" because new tab page 396 is what is displayed. It should be recognized that other content (other than new tab page 396) can be determined to be the content previously displayed by local browser 310, such as a web page.

Figure 4:
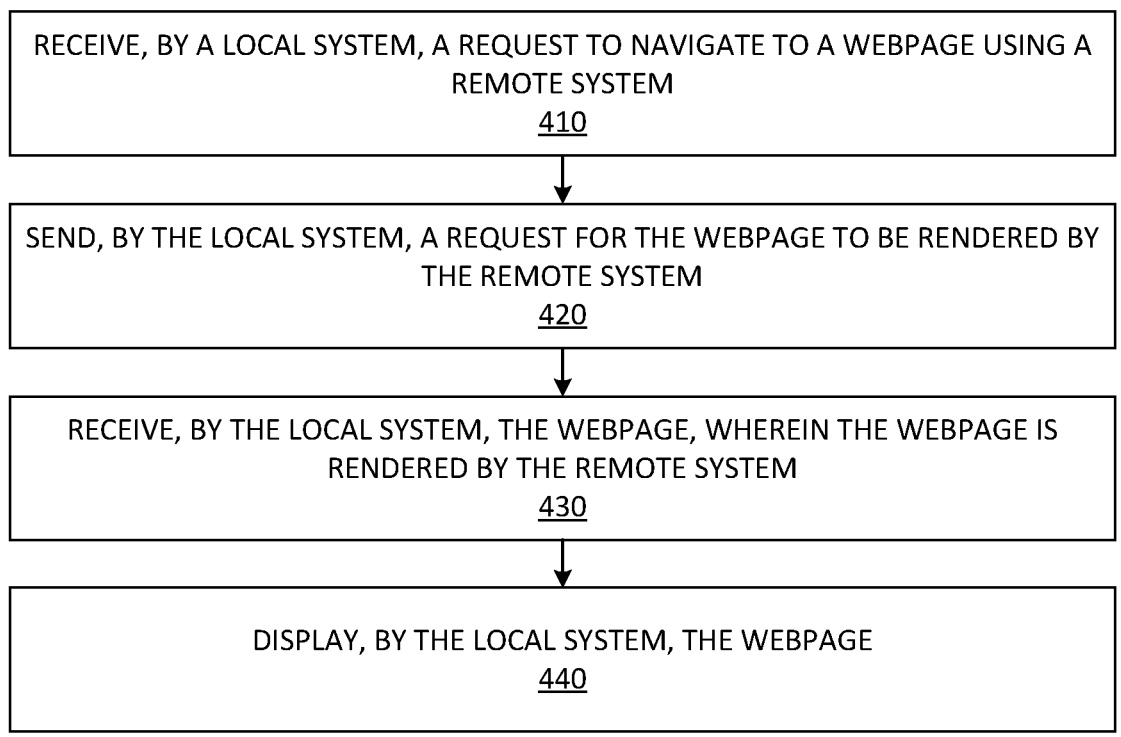
FIG. 4 depicts processing performed by a local system for displaying a representation of a webpage according to certain examples described herein.

FIG. 4 depicts processing performed by a local system for displaying a representation of a webpage according to certain examples described herein. The processing depicted in FIG. 4 can be implemented in software (e.g., code, instructions, program, or the like) executed by one or more processing units (e.g., processor cores), in hardware, or using combinations thereof. The software can be stored on a transitory or non-transitory computer readable medium (e.g., a storage device, memory, or the like). In some examples, some blocks of FIG. 4 can be omitted, additional blocks can be added, and/or the order of the blocks can be changed.

In one example, the processing depicted in FIG. 4 is performed by a local browser (e.g., local browser 110 as depicted in FIG. 1) of the local system. In another example, the processing depicted in FIG. 4 is performed by a local helper subsystem (e.g., local BHO 112 as depicted in FIG. 1) of the local system. The local BHO can be running on the local browser that is executing on the local system. When referring to a local browser or local system below, it should be recognized that the local helper subsystem can be performing the action. When referring to a remote browser or remote system below, it should be recognized that the remote helper subsystem can be performing the action.

The processing depicted in FIG. 4 begins when a request is received by the local system. The request can be to navigate to a webpage using a remote system (410). In some examples, the request can be received by the local system via the local browser executing on the local system and the request can be for a remote browser (e.g., remote browser 120 as depicted in FIG. 1) executing on the remote system to navigate to the webpage.

In response to receiving the request, the local system can send a request for the webpage to be rendered by the remote system (420). This request can be sent to the remote browser of the remote system. In response to receiving the request, the remote browser can obtain an HTML document representing the webpage. For example, the remote browser can send a request for the webpage to a server hosting the webpage, and the server can respond with the HTML document. Using the HTML document, the remote browser can render a representation of the webpage for display.

The local system can receive the representation of the webpage rendered by the remote system (430) and display the representation of the webpage (440). In some examples, the local browser of the local system can display the representation of the webpage, as depicted in FIG. 3A.

Figure 5:
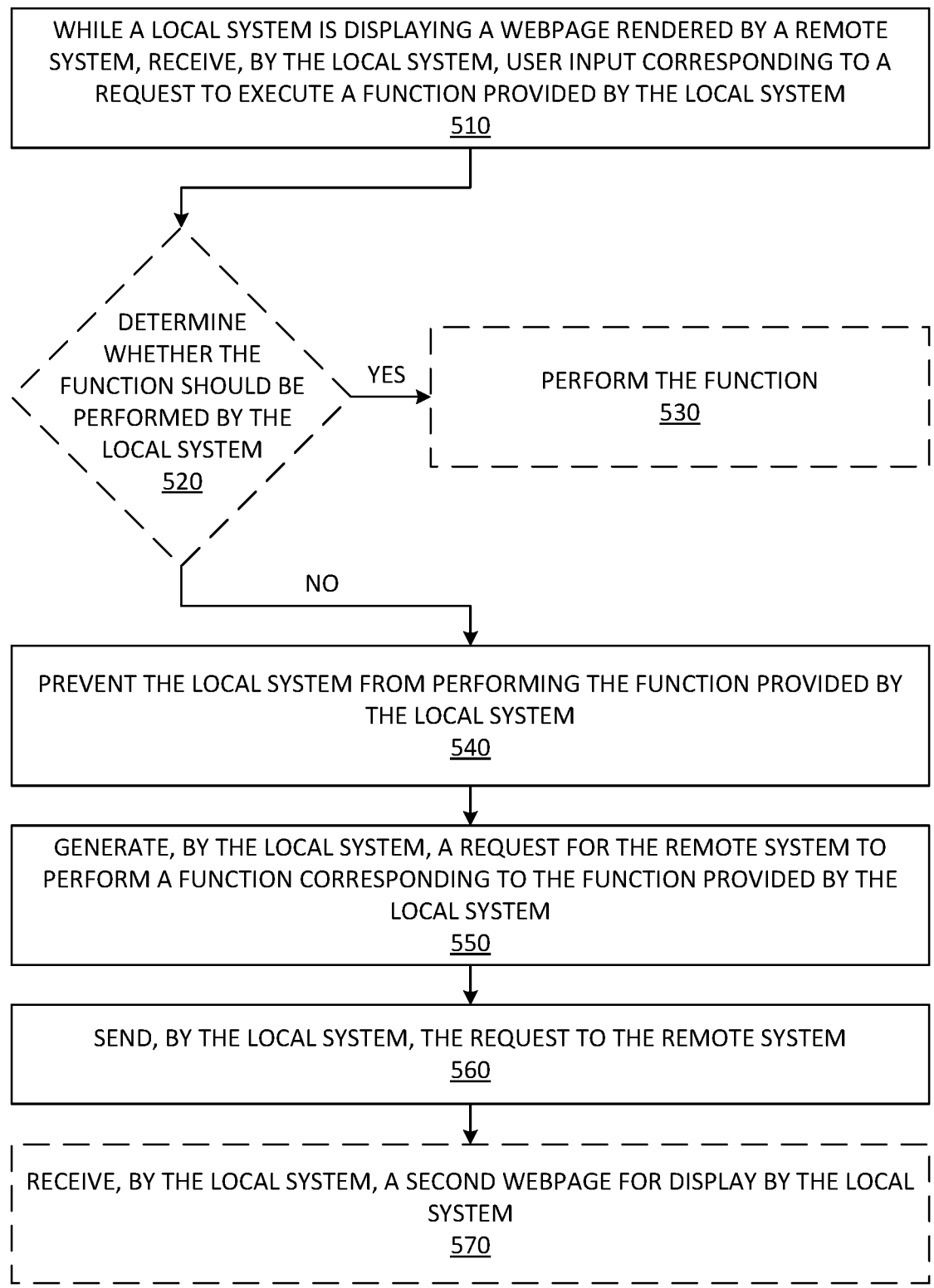
FIG. 5 depicts processing performed by a local system for performing a function designated for a remote system according to certain examples described herein.

FIG. 5 depicts processing performed by a local system for performing a function designated for a remote system according to certain examples described herein. The processing depicted in FIG. 5 can be implemented in software (e.g., code, instructions, program, or the like) executed by one or more processing units (e.g., processor cores), in hardware, or using combinations thereof. The software can be stored on a transitory or non-transitory computer readable medium (e.g., a storage device, memory, or the like). In some examples, some blocks of FIG. 5 can be omitted, additional blocks can be added, and/or the order of the blocks can be changed.

In some examples, the processing depicted in FIG. 5 is performed by a local browser (e.g., local browser 110 as depicted in FIG. 1) of the local system. In some examples, the processing depicted in FIG. 5 is performed by a local helper subsystem (e.g., local BHO 112 as depicted in FIG. 1) of the local system. The local BHO can be configured to run on the local browser that is executing on the local system. When referring to a local browser or local system below, it should be recognized that the local helper subsystem can be performing the action. When referring to a remote browser or remote system below, it should be recognized that the remote helper subsystem can be performing the action.

The processing depicted in FIG. 5 begins when user input is received by the local system (510). The user input (1) corresponds to a request to execute a function provided by the local system and (2) is received while the local system is displaying a representation of a webpage rendered by the remote system, as depicted in FIGS. 3B, 3D, and 3F. In some examples, content (e.g., the representation of the webpage) received by the local system from the remote system does not include a visual representation corresponding to one or more functions provided by the remote system. In some examples, the user input can be a mouse click, a finger tap, input of a keyboard key, a verbal command, or the like.

In response to receiving the user input, the local system determines whether the function should be performed by the local system (520). This block is depicted in a dotted box to illustrate that the block is optional. While some embodiments can include this block, others might not and instead prevent all functions from being performed by the local system. However, it should be recognized that any block depicted herein (whether the block is depicted in a dotted box) can be optional.

In some examples, determining whether the function should be performed by the local system includes determining whether the function is provided by a remote browser of the remote system (e.g., an actively displayed remove browser). If the function is provided by the remote browser, a determination is made that the function should be performed by the remote browser and not the local system. If the function is not provided by the remote browser or no remote browser is actively being displayed, a determination is made that the function should be performed by the local browser of the local system and not any remote browser.

In some examples, the local system includes a data structure (e.g., a list, a table, an array, or the like) indicating which functions should be performed by the local system and/or which functions should be performed by the remote system. In such examples, determining whether the function should be performed by the local system can be based upon the data structure.

It should be recognized that determining whether the function should be performed by the local system can be performed in other ways.

In response to determining that the function should be performed by the local system, the local system can perform the function (530), as depicted in FIG. 3E. This block is depicted in a dotted box to illustrate that the block is optional. While some embodiments can include this block, others might not and instead prevent all functions from being performed by the local system. However, it should be recognized that any block depicted herein (whether the block is depicted in a dotted box) can be optional. Optionally, further in response to determining that the function should be performed by the local system, the local system forgoes generating a request for the remote system to perform the function.

When it is determined that the function should be performed by the remote system, the local system forgoes or prevents the local system from performing the function provided by the local system (540). Preventing the local system from performing the function can include the local BHO not causing the function to be performed by the local system.

In response to determining that the function should be performed by the remote system, a request is generated by the local system (550). The request generated by the local system is for the remote system to perform a function (e.g., a function provided by the remote system) corresponding to the function provided by the local system. The request can include an identification of the function provided by the local system, the function corresponding to the function provided by the local system, a general definition of the function provided by the local system, or the like. After generating the request, the local system sends the request to the remote system (560). In some examples, the local BHO sends the request.

Depending upon the function provided by the remote system, the remote system can send a response to the request sent by the local system. For example, the request can cause the remote system to modify a current representation of a webpage or obtain a new representation of a webpage similar as described in FIG. 4. Both a modification to a current representation of a webpage and a new representation of a webpage are referred to as a representation of a second webpage herein. The local system can receive the representation of the second webpage for display by the local system (570). Similar to as described above, the representation of the second webpage can be a representation of the remote browser, including a rendered webpage. Examples of the local browser displaying the representation of the second webpage are depicted in FIGS. 3C and 3G.

Figure 6:
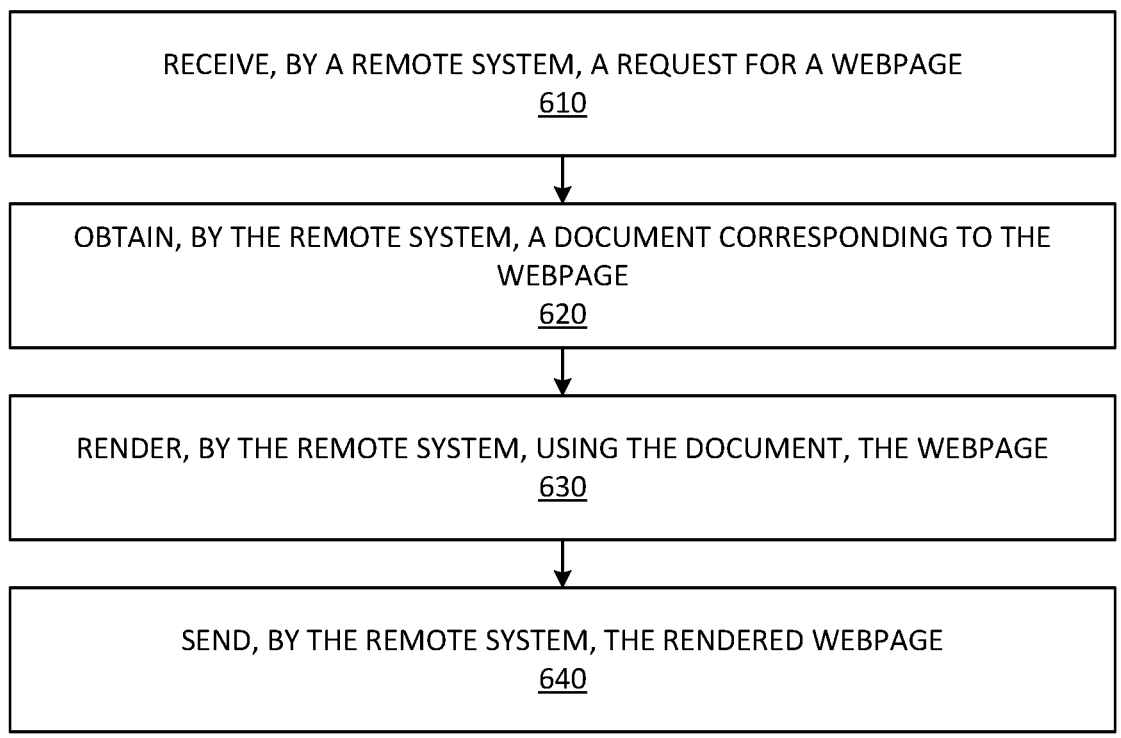
FIG. 6 depicts processing performed by a remote system for responding to a request for a webpage according to certain examples described herein.

FIG. 6 depicts processing performed by a remote system for responding to a request for a webpage according to certain examples described herein. The processing depicted in FIG. 6 can be implemented in software (e.g., code, instructions, program, or the like) executed by one or more processing units (e.g., processor cores), in hardware, or using combinations thereof. The software can be stored on a transitory or non-transitory computer readable medium (e.g., a storage device, memory, or the like). In some examples, some blocks of FIG. 6 can be omitted, additional blocks can be added, and/or the order of the blocks can be changed.

In some example, the processing depicted in FIG. 6 is performed by a remote browser (e.g., remote browser 120 as depicted in FIG. 1) of the remote system. In some examples, the processing depicted in FIG. 6 is performed by a remote helper subsystem (e.g., remote BHO 122 as depicted in FIG. 1) of the remote system. The remote BHO can be running as part of the remote browser that is executing on the remote system. When referring to a remote browser or remote system below, it should be recognized that the remote helper subsystem can be performing the action. When referring to a local browser or local system below, it should be recognized that the local helper subsystem can be performing the action.

The processing depicted in FIG. 6 begins when a request for a webpage is received by the remote system (610). The request can correspond to the request described above at 420 for FIGS. 4 and 560 for FIG. 5.

In response to receiving the request, the remote system obtains a document (e.g., an HTML document) corresponding to the webpage (620). Using the document, the remote system renders a representation of the webpage (630). The representation of the webpage is then sent to the local system by the remote system to be displayed using a local browser running on the local system (640). In some examples, content (e.g., the representation of the webpage) received by the local system from the remote system does not include visual representations corresponding to one or more functions provided by the remote system.

Figure 7:
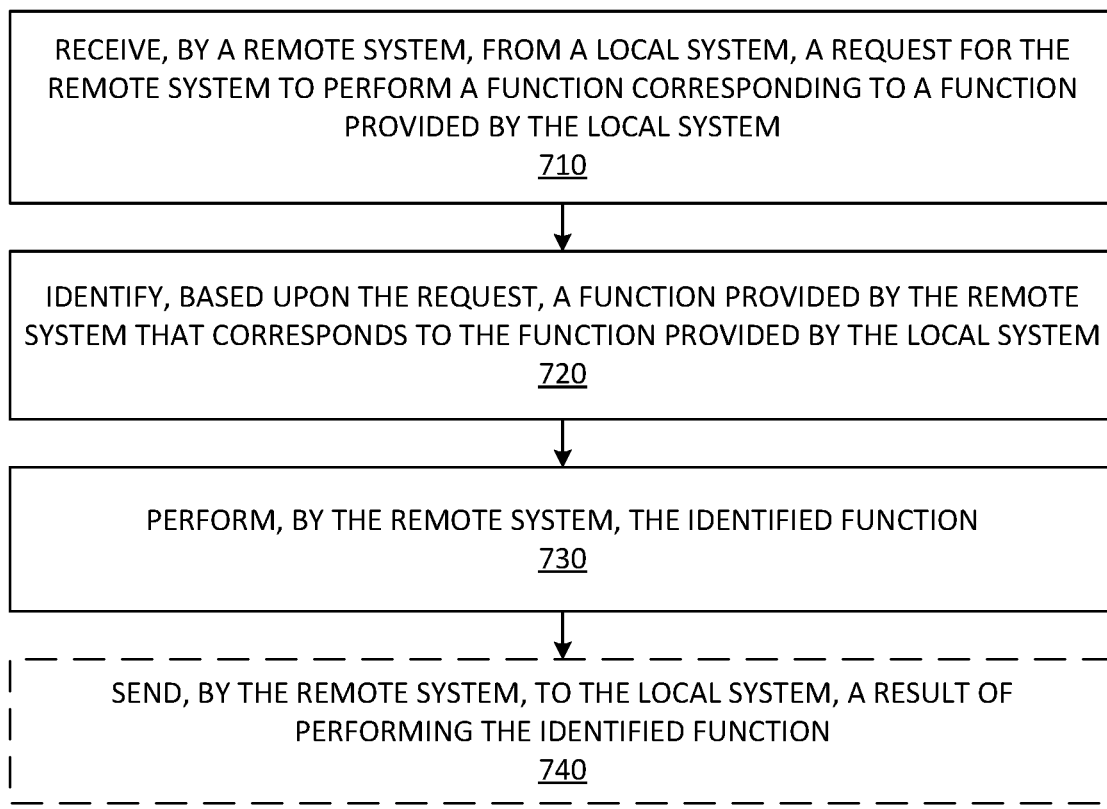
FIG. 7 depicts processing performed by a remote system for performing a function according to certain examples described herein.

FIG. 7 depicts processing performed by a remote system for performing a function according to certain examples described herein. The processing depicted in FIG. 7 can be implemented in software (e.g., code, instructions, program, or the like) executed by one or more processing units (e.g., processor cores), in hardware, or using combinations thereof. The software can be stored on a transitory or non-transitory computer readable medium (e.g., a storage device, memory, or the like). In some examples, some blocks of FIG. 7 can be omitted, additional blocks can be added, and/or the order of the blocks can be changed.

In one example, the processing depicted in FIG. 7 is performed by a remote browser (e.g., remote browser 120 as depicted in FIG. 1) of the remote system. In another example, the processing depicted in FIG. 7 is performed by a remote helper subsystem (e.g., remote BHO 122 as depicted in FIG. 1) of the remote system. The remote BHO can be running on the remote browser that is executing on the remote system. When referring to a remote browser or remote system below, it should be recognized that the remote helper subsystem can be performing the action. When referring to a local browser or local system below, it should be recognized that the local helper subsystem can be performing the action.

The processing depicted in FIG. 7 begins when a request is received for the remote system to perform a function corresponding to a function provided by a local system (710). The request can be received from the local system by the remote system. The request can correspond to the request described at 560 in FIG. 5. In some examples, the request depicted in FIG. 7 can be referred to as a communication indicating that a function provided by the local browser has been requested. In some examples, while the communication can indicate that the function provided by the local browser has been requested, the communication might not include an identification of the function provided by the local browser. Instead, the communication can include an identification of a function corresponding to the function provided by the local browser or an identification of a unique identifier that corresponds to the function provided by the local browser.

In response to receiving the request, a function provided by the remote system can be identified based upon the request (720). The identified function can correspond to the function provided by the local system. In some examples, the identified function can be the same or different than the function provided by the local system. For example, the identified function can correspond to a first type of browser and the function provided by the local system can correspond to a second type of browser different than the first type. When the identified function is different than the function provided by the local system, the two functions can be paired together by an administrator such that the correspondence between the two are pre-defined. In some examples, execution of the function provided by the local system is canceled in response to determining to execute the function performed by the remote system.

In response to identifying the function, the remote system can perform the identified function (730). The function can correspond to a function provided by the remote browser or the remote system. In some examples, performing the function can generate a result (e.g., a representation of a second webpage or information) to send to the local system. In such examples, the remote system can send the result to the local system (740). In some examples, the result can include a communication that is sent to the local system to cause the local system to change at least a portion of what the local system is presenting.

Figure 8:
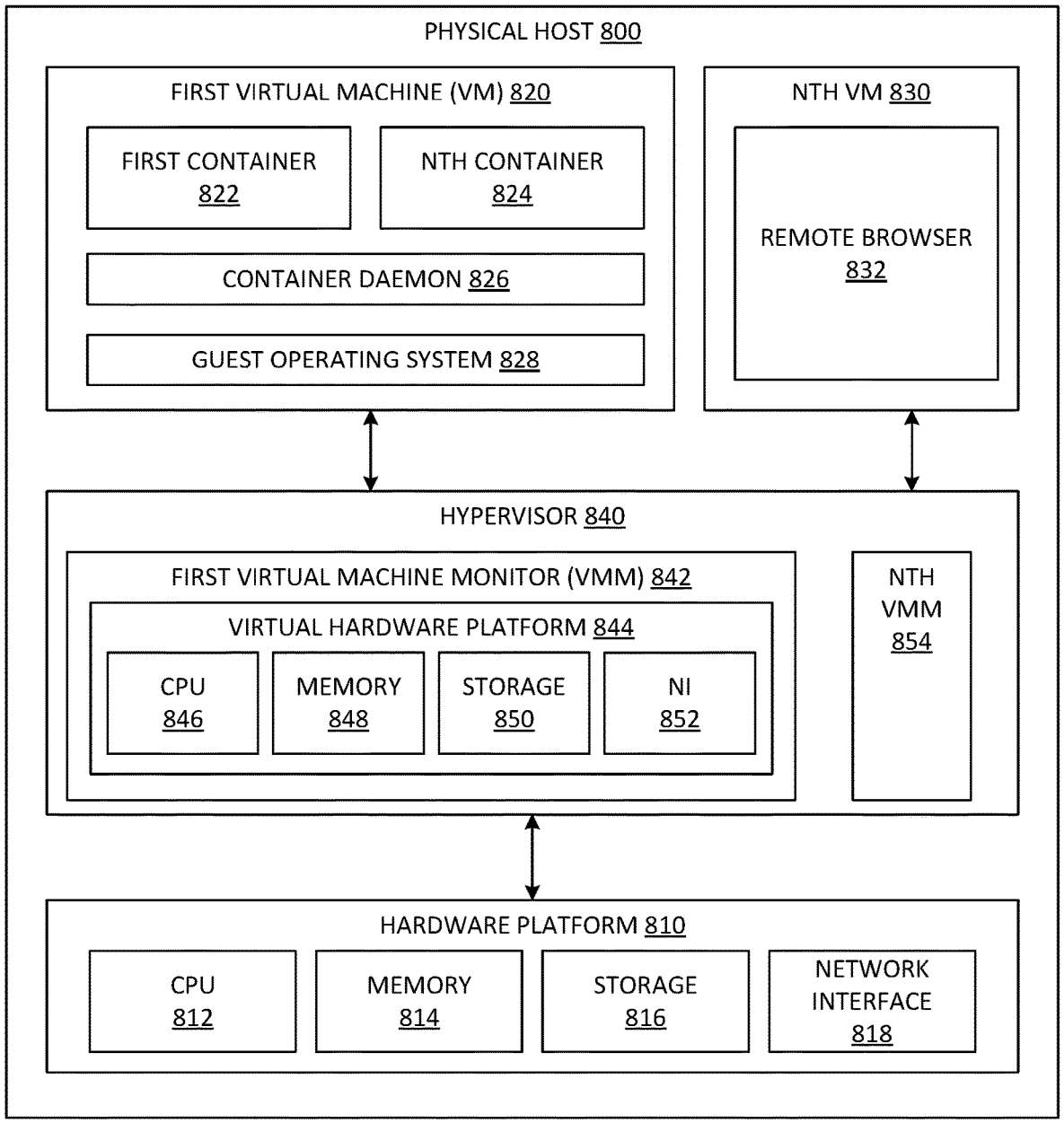
FIG. 8 depicts an example of a computing system that can be used for certain examples described herein.

FIG. 8 depicts an example of a computing system that can be used for certain examples described herein. As depicted, the computing system includes physical host 800. However, while a single physical host is depicted in FIG. 8, it should be recognized that a computing system can include multiple physical hosts, which can be arranged in an interconnected system such as a data center.

Physical host 800 can be configured to provide a virtualization layer that abstracts computing resources of hardware platform 810. The virtualization layer can provide one or more virtual machines (e.g., first virtual machine 820 and nth virtual machine 830) that run concurrently on the same physical host 800. Hardware platform 810 can include hardware resources, such as one or more central processing units (e.g., CPU 812), memory 814, storage 816, networking interface 818, other conventional components of a computing device, any combination thereof, or the like.

In some examples, nth virtual machine 830 can be executing remote browser 832; however, it should be recognized that other components of physical host 800 can execute remote browser 832, such as first container 822 or hardware platform 810. Remote browser 832 can perform one or more operations described above. For example, remote browser 832 can receive requests for webpages, obtain HTML documents for webpages, render representations of the webpages from HTML documents, send representations of webpages to local browsers, perform functions provided by remote browser 832. In some examples, remote browser 832 can include a remote BHO (e.g., remote BHO 122 as depicted in FIG. 1). The remote BHO can receive requests for functions, identify functions performed by remote browser 832 that correspond to functions included in requests, cause remote browser 832 to execute identified functions. The remote BHO can also configure what is sent from remote browser 832 to local browsers.

The one or more virtual machines can run on top of a software interface layer, referred to herein as hypervisor 840, that enables sharing of the hardware resources of physical host 800 to the one or more virtual machines. One example of hypervisor 840 that can be used in an example described herein is a VMware ESXi hypervisor. Hypervisor 840 can run on top of a host operating system of physical host 800 or directly on hardware components of physical host 800.

Hypervisor 840 can provide a device driver layer configured to map hardware resources of hardware platform 810 to virtual resources of each virtual machine of the one or more virtual machines such that each virtual machine has its own corresponding virtual hardware platform (e.g., virtual hardware platform 844). Virtual hardware platform 844 can provide emulated hardware (e.g., CPU 846, memory 848, storage 850, a network interface (referred to as NI 852), etc.) that can, for example, function as an equivalent, conventional hardware architecture for its corresponding virtual machine. Virtual hardware platform 844 can be considered as part of a corresponding virtual machine monitor (e.g., first virtual machine monitor 842), which implements virtual system support to coordinate operations between hypervisor 840 and corresponding virtual machines.

A virtual machine can include a guest operating system (e.g., guest operating system 828), such as Microsoft Windows, Linux, or the like. A virtual machine can also include one or more guest applications and processes running on top of a guest operating system. A virtual machine can also include a container daemon (e.g., container daemon 826) installed therein and running as a guest application under control of a guest operating system for the virtual machine. Container daemon 826 can be a process that enables deployment and management of virtual instances (referred to interchangeably herein as "containers" or "virtual containers") by providing a layer of operating-system-level virtualization on a guest operating system within a virtual machine.

With a container, a kernel of an operating system (either host operating system or guest operating system) can be configured to provide multiple isolated user space instances. These instances, referred to as containers, appear as unique servers from the standpoint of an end user that communicates with the containers. However, from the standpoint of the operating system, the containers are user processes that are scheduled and dispatched by the operating system. A container can be a package (sometimes referred to as an "image") of pre-installed application code and any binaries and libraries used for execution of that application code to create a virtualized application. In some cases, a container can be a blank image into which applications can be installed or launched within. A container on a virtual machine can be run as an isolated process in userspace on a guest operating system, sharing a kernel of the guest operating system with other containers.

Container daemon 826 can be configured to utilize resource isolation features of a guest operating system to permit multiple virtual containers (e.g., first virtual container 822 and nth virtual container 824) to run within a single virtual machine. For example, in cases where a guest operating system includes a Linux kernel, a container daemon can use features such as kernel namespaces to isolate a container's view of the guest operating system, including process and user IDs, process trees, mounted file systems, and the Control Groups (or "cgroups") feature to isolate a virtual central processing unit (e.g., CPU 846), a virtual memory (e.g., memory 848), a virtual storage (e.g., storage 850), a virtual networking interface (e.g., NI 852), any combination thereof, or the like.

Container daemon 826 can execute system calls and request operating system services and virtual machine resources from a guest operating system. In response, the guest operating system can allocate virtual resources to container daemon 826, where virtual resources correspond to physical resources (such as CPU 812, memory 814, storage 816, network interface 818, or the like). The physical resources can be allocated by hypervisor 840, which manages execution of both virtual machines with containers and virtual machines without containers.

Container daemon 826 can communicate with local (or remote) processes according to a client/server model. For example, a client process (e.g., a system administration process) can transmit a request to container daemon 826 to deploy a container or to update an already existing container, for example, by installing a new application within the container. Further, another client process can transmit a request to the container daemon to quiesce or destroy a container.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method, comprising:
presenting, by a local browser, content provided by a remote browser including a representation of a webpage rendered by the remote browser within the local browser, wherein content provided by the remote browser does not include visual representations of functions of the remote browser that are provided by the remote browser and that correspond to visual representations of functions provided by the local browser;
while the local browser is presenting the representation of the webpage within the presented content of the remote browser, receiving, by the local browser, user input to a first visual representation of the local browser corresponding to a request to execute a first navigation function to control navigation within the local browser;
in response to determining that the webpage is being presented by the remote browser and that a second navigation function provided by the remote browser corresponds to the first navigation function provided by the local browser, preventing, by the local browser, the first navigation function provided by the local browser from being performed by the local browser to control navigation within the local browser; and
sending, by the local browser, to the remote browser, a communication indicating that the first navigation function provided by the local browser has been requested, wherein the communication causes the remote browser to execute the second navigation function corresponding to the first navigation function provided by the local browser to control navigation within the remote browser.

2. The method of claim 1, wherein content sent by the remote browser for the local browser to present does not include a second visual representation corresponding to the second navigation function executed by the remote browser.

3. The method of claim 1, wherein the communication is sent by the local browser to the remote browser while the local browser is presenting the representation of the webpage.

4. The method of claim 1, further comprising:
receiving, by the local browser, a representation of a second webpage to be presented by the local browser, wherein the representation of the second webpage is sent to the local browser in response to execution of the second navigation function corresponding to the first navigation function provided by the local browser.

5. The method of claim 1, further comprising:
receiving, by the local browser, a communication causing the local browser to change at least a portion of what the local browser is presenting.

6. The method of claim 1, wherein the second navigation function executed by the remote browser is the same as the first navigation function provided by the local browser.

7. The method of claim 1, further comprising:
identifying a generic identification of the first navigation function provided by the local browser such that the generic identification is unrelated to the local browser, wherein the communication includes the generic identification.

8. A non-transitory computer readable storage medium storing one or more programs, the one or more programs comprising instructions, which when executed by a device, cause the device to:
present content provided by a remote browser including a representation of a webpage rendered by the remote browser within a local browser, wherein content provided by the remote browser does not include visual representations of functions of the remote browser that are provided by the remote browser and that correspond to visual representations of functions provided by the local browser;
while the device is presenting the representation of the webpage within the presented content of the remote browser, receive user input to a first visual representation of the local browser corresponding to a request to execute a first navigation function to control navigation within the local browser;
in response to determining that the webpage is being presented by the remote browser and that a second navigation function provided by the remote browser corresponds to the first navigation function provided by the local browser, prevent the first navigation function provided by the device from being performed by the device to control navigation within the local browser; and
send, to the remote browser, a communication indicating that the first navigation function provided by the device has been requested, wherein the communication causes the remote browser to execute the second navigation function corresponding to the first navigation function provided by the device to control navigation within the remote browser.

9. A system comprising:
one or more processors;
memory; and
one or more programs, wherein the one or more programs are stored in the memory and configured to be executed by the one or more processors, the one or more programs including instructions for:
presenting content provided by a remote browser including a representation of a webpage rendered by the remote browser within a local browser, wherein content provided by the remote browser does not include visual representations of functions of the remote browser that are provided by the remote browser and that correspond to visual representations of functions provided by the local browser;
while the system is presenting the representation of the webpage within the presented content of the remote browser, receiving user input to a visual representation of the local browser corresponding to a request to execute a first navigation function provided by the system to control navigation within the local browser;
in response to determining that the webpage is being presented by the remote browser and that a second navigation function provided by the remote browser corresponds to the first navigation function provided by the local browser, preventing the first navigation function provided by the system from being performed by the system to prevent the navigation within the local browser; and
sending, to the remote browser, a communication indicating that the first navigation function provided by the system has been requested, wherein the communication causes the remote browser to execute the second navigation function corresponding to the first navigation function provided by the system to control navigation within the remote browser.

10. The non-transitory computer readable storage medium of claim 8, wherein content sent by the remote browser for the local browser to present does not include a second visual representation corresponding to the second navigation function executed by the remote browser.

11. The non-transitory computer readable storage medium of claim 8, wherein the communication is sent by the local browser to the remote browser while the local browser is presenting the representation of the webpage.

12. The non-transitory computer readable storage medium of claim 8, further comprising instructions, which when executed by the device, cause the device to:
receive, by the local browser, a representation of a second webpage to be presented by the local browser, wherein the representation of the second webpage is sent to the local browser in response to execution of the second navigation function corresponding to the first navigation function provided by the local browser.

13. The non-transitory computer readable storage medium of claim 8, further comprising instructions, which when executed by the device, cause the device to:
receive, by the local browser, a communication causing the local browser to change at least a portion of what the local browser is presenting.

14. The non-transitory computer readable storage medium of claim 8, wherein the second navigation function executed by the remote browser is the same as the first navigation function provided by the local browser.

15. The non-transitory computer readable storage medium of claim 8, further comprising instructions, which when executed by the device, cause the device to:
identify a generic identification of the first navigation function provided by the local browser such that the generic identification is unrelated to the local browser, wherein the communication includes the generic identification.

16. The system of claim 9, wherein content sent by the remote browser for the local browser to present does not include a second visual representation corresponding to the second navigation function executed by the remote browser.

17. The system of claim 9, wherein the communication is sent by the local browser to the remote browser while the local browser is presenting the representation of the webpage.

18. The system of claim 9, wherein the one or more programs further includes instructions for:
receiving, by the local browser, a representation of a second webpage to be presented by the local browser, wherein the representation of the second webpage is sent to the local browser in response to execution of the second navigation function corresponding to the first navigation function provided by the local browser.

19. The system of claim 9, wherein the one or more programs further includes instructions for:
receiving, by the local browser, a communication causing the local browser to change at least a portion of what the local browser is presenting.

20. The system of claim 9, wherein the second navigation function executed by the remote browser is the same as the first navigation function provided by the local browser.

21. The system of claim 9, wherein the one or more programs further includes instructions for:
identifying a generic identification of the first navigation function provided by the local browser such that the generic identification is unrelated to the local browser, wherein the communication includes the generic identification.

* * * * *